United States Patent
Yamaura et al.

(10) Patent No.: US 11,096,087 B2
(45) Date of Patent: Aug. 17, 2021

(54) CONTROL DEVICE, CONTROL METHOD, COMPUTER PROGRAM PRODUCT, AND COMMUNICATION SYSTEM

(71) Applicant: Toshiba Memory Corporation, Minato-ku (JP)

(72) Inventors: Takahiro Yamaura, Kawasaki (JP); Masataka Goto, Minato (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/126,455

(22) Filed: Sep. 10, 2018

(65) Prior Publication Data

US 2019/0289494 A1 Sep. 19, 2019

(30) Foreign Application Priority Data

Mar. 13, 2018 (JP) .............................. JP2018-045745

(51) Int. Cl.
| | |
|---|---|
| *G06F 11/16* | (2006.01) |
| *H04L 12/927* | (2013.01) |
| *H04L 12/58* | (2006.01) |
| *H04W 4/40* | (2018.01) |
| *H04L 12/24* | (2006.01) |
| *H04W 28/04* | (2009.01) |
| *H04W 4/70* | (2018.01) |
| *G06F 16/27* | (2019.01) |

(52) U.S. Cl.
CPC ......... *H04W 28/04* (2013.01); *G06F 11/1637* (2013.01); *G06F 16/27* (2019.01); *H04L 47/806* (2013.01); *H04L 51/22* (2013.01); *H04W 4/70* (2018.02); *G06F 2201/85* (2013.01); *H04L 41/08* (2013.01); *H04L 41/12* (2013.01); *H04W 4/40* (2018.02)

(58) Field of Classification Search
CPC ..... H04L 47/2441; H04L 43/50; H04L 12/56; H04L 12/28; H04W 4/00; G06F 15/16; H04N 7/173
See application file for complete search history.

(56) References Cited

U.S. PATENT DOCUMENTS

| | | | |
|---|---|---|---|
| 5,732,265 A | 3/1998 | Dewitt et al. | |
| 8,938,417 B2 | 1/2015 | Haustein et al. | |
| 2007/0124453 A1 | 5/2007 | Slaughter et al. | |
| 2008/0002707 A1* | 1/2008 | Davis .................. | H04L 12/4645 370/392 |
| 2010/0274857 A1 | 10/2010 | Garza et al. | |
| 2011/0004699 A1* | 1/2011 | Han ...................... | H04L 67/104 709/235 |
| 2018/0070126 A1* | 3/2018 | Martel ............... | H04N 21/4302 |

FOREIGN PATENT DOCUMENTS

JP 2016-517551 6/2016

* cited by examiner

*Primary Examiner* — Iqbal Zaidi
(74) *Attorney, Agent, or Firm* — Oblon, McClelland, Maier & Neustadt, L.L.P.

(57) ABSTRACT

According to one embodiment, a control device includes one or more processors. The one or more processors receive a message. The one or more processors determine whether the received message has been replicated and transmitted. The one or more processors instruct recording of difference information between a message before replication and the received message when it is determined that the received message has been replicated and transmitted.

14 Claims, 27 Drawing Sheets

| TRANSMISSION DESTINATION MAC ADDRESS | VLAN ID | STREAM ID |
|---|---|---|
| CC-CC-CC-CC-CC-CC | 100 | 1 |

| TRANSMISSION DESTINATION MAC ADDRESS | VLAN ID | STREAM ID |
|---|---|---|
| CC-CC-CC-CC-CC-CC | 10 | 2 |
| CC-CC-CC-CC-CC-CC | 20 | 3 |

| TRANSMISSION DESTINATION MAC ADDRESS | VLAN ID | STREAM ID |
|---|---|---|
| CC-CC-CC-CC-CC-CC | 10 | 2 |
| CC-CC-CC-CC-CC-CC | 20 | 3 |

| TRANSMISSION DESTINATION MAC ADDRESS | VLAN ID | STREAM ID |
|---|---|---|
| CC-CC-CC-CC-CC-CC | 100 | 1 |

FIG.9

| TRANS-MISSION DESTINA-TION MAC ADDRESS | TRANS-MISSION SOURCE MAC ADDRESS | TYPE/LENGTH (0x8100) | PRIORITY (PCP) | CFI | VLAN ID | TYPE/LENGTH (R-tag) | RESERVA-TION | SE-QUENCE NUMBER | TYPE/LENGTH | DATA | FCS |

VLAN Tag: TYPE/LENGTH (0x8100), PRIORITY (PCP), CFI, VLAN ID

Redundancy Tag: TYPE/LENGTH (R-tag), RESERVATION, SEQUENCE NUMBER

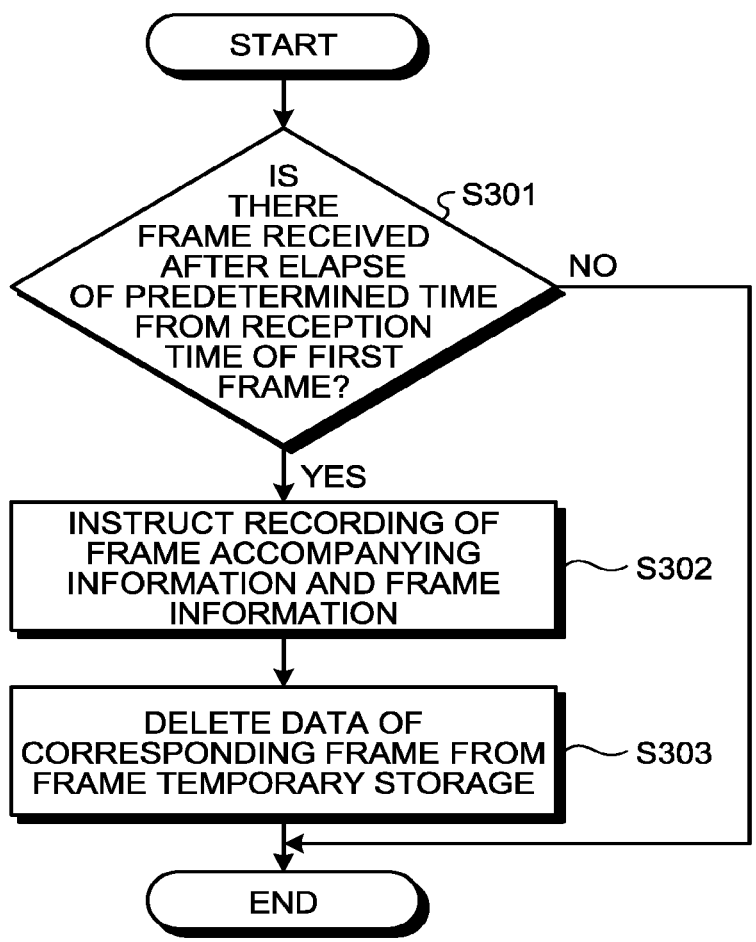

FIG.14

| STREAM IDENTIFIER | | SEQUENCE NUMBER | RECEPTION TIME | RECORDING TO RECORDING DEVICE | FCS ERROR | RECEPTION PORT NUMBER | FRAME ENTIRE DATA | FRAME INFORMATION RECORDING INSTRUCTION |
|---|---|---|---|---|---|---|---|---|
| TRANSMISSION DESTINATION MAC ADDRESS | VLAN ID | | | | | | | |
| CC-CC-CC-CC-CC-CC | 20 | 379 | 2018-02-26 10:10:23.6723 24123 | PRESENT | PRESENT | 1 | xxxxxx | INSTRUCTED |
| | 10 | 378 | 2018-02-26 10:10:23.5723 24031 | ABSENT | ABSENT | 0 | xxxxxx | INSTRUCTED |
| | 20 | | 2018-02-26 10:10:23.5723 24012 | PRESENT | ABSENT | 1 | xxxxxx | NOT INSTRUCTED |
| | 10 | 376 | 2018-02-26 10:10:23.5713 24012 | ABSENT | ABSENT | 0 | xxxxxx | INSTRUCTED |
| | 20 | 323 | 2018-02-26 10:10:22.5726 25112 | PRESENT | ABSENT | 1 | xxxxxx | INSTRUCTED |

STREAM IDENTIFIER IN RECORDING DEVICE

STREAM IDENTIFIER IN CONTROL DEVICE

FIG.19

| TYPE (WHOLE RECORDING FORMAT) | LENGTH | FRAME ENTIRE DATA |
|---|---|---|

FIG.25

| | | | | | |
|---|---|---|---|---|---|
| TRANSMISSION DESTINATION MAC ADDRESS | | CC-CC-CC-CC-CC-CC | CC-CC-CC-CC-CC-CC | CC-CC-CC-CC-CC-CC | ... |
| VLAN ID | | 20 | 20 | 20 | ... |
| SEQUENCE NUMBER | | 379 | 378 | 323 | ... |
| DATA OF RECORDING DEVICE | RECEPTION TIME | 2018-02-26 10:10:23.672224123 | 2018-02-26 10:10:23.572224012 | 2018-02-26 10:10:22.572525112 | ... |
| | FRAME ENTIRE DATA | XXXXXX | XXXXXX | XXXXXX | ... |
| | FCS ERROR | ABSENT | ABSENT | ABSENT | ... |
| | RECEPTION PORT NUMBER | 0 | 0 | 0 | ... |
| | IDENTIFICATION INFORMATION OF CONTROL DEVICE | DD-DD-DD-DD-DD | DD-DD-DD-DD-DD | DD-DD-DD-DD-DD | ... |
| DATA 1 OF CONTROL DEVICE | STREAM ID | {CC-CC-CC-CC-CC-CC, 20} | {CC-CC-CC-CC-CC-CC, 10} | {CC-CC-CC-CC-CC-CC, 20} | ... |
| | RECEPTION TIME | 2018-02-26 10:10:23.672324123 | 2018-02-26 10:10:23.572324031 | 2018-02-26 10:10:22.572625112 | ... |
| | DATA (PRESENCE OR ABSENCE, TYPE, DEVICE AS BASIS, DATA) OF FRAME | {PRESENT, WHOLE RECORDING, EE-EE-EE-EE-EE-EE, LENGTH: 128 OCTET, DATA: XXXXXX} | {PRESENT, DIFFERENCE, EE-EE-EE-EE-EE-EE, NUMBER OF PIECES OF DIFFERENCE DATA: 1, START POSITION: 14 OCTET, LENGTH: 2 OCTET, DATA: 0xE00A} | PRESENT | ... |
| | FCS ERROR | PRESENT | ABSENT | ABSENT | ... |
| | RECEPTION PORT NUMBER | 1 | 0 | 1 | ... |
| DATA 2 OF CONTROL DEVICE | IDENTIFICATION INFORMATION OF CONTROL DEVICE | | | DD-DD-DD-DD-DD | ... |
| | STREAM ID | | | {CC-CC-CC-CC-CC-CC, 20} | ... |
| | RECEPTION TIME | | | NO RECEPTION (SPECIAL VALUE) | ... |
| | DATA (PRESENCE OR ABSENCE, TYPE, DEVICE AS BASIS, DATA) OF FRAME | | | | ... |
| | FCS ERROR | | | | ... |
| | RECEPTION PORT NUMBER | | | | ... |
| ... | | ... | ... | ... | |

CONTROL DEVICE, CONTROL METHOD, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2018-045745, filed on Mar. 13, 2018; the entire contents of which are incorporated herein by reference.

FIELD

Embodiments described herein relate generally to a control device, a control method, a computer program product, and a communication system.

BACKGROUND

In moving vehicles such as automobiles, railway trains, and aircrafts, there is a demand for recording of communication history between a plurality of control devices used for control of the moving vehicles in order to separate causes in the event of an accident. In addition, a configuration in which a message (frame) is replicated and transmitted through different routes, as defined by IEEE 802.1CB or the like, is employed in these control devices in some cases in order to prevent communication from being disabled due to disconnection of a communication path or the like.

In the conventional technique, however, there is a case where the consumption of network bandwidths in the moving vehicle increases. For example, when it is configured such that the communication history is recorded in a recording device connected to a network in the moving vehicle, the same data which has been replicated and transmitted is transmitted to the recording device so that there is a problem that the consumption of the network bandwidths increases.

BRIEF DESCRIPTION OF THE DRAWINGS

FIG. 9 is a view illustrating a format example of a frame;

FIG. 13 is a flowchart of timer processing;

FIG. 14 is a table illustrating an example of recording a frame in a frame temporary storage unit;

FIG. 19 is a view illustrating an example of a format of frame information;

FIG. 25 is a view illustrating a configuration example of data stored in a storage unit of the recording device;

DETAILED DESCRIPTION

According to one embodiment, a control device includes one or more processors. The one or more processors receive a message. The one or more processors determine whether the received message has been replicated and transmitted. The one or more processors instruct recording of difference information between a message before replication and the received message when it is determined that the received message has been replicated and transmitted.

Hereinafter, preferred embodiments of a control device, a control method, a program, and a communication system according to the present invention will be described in detail with reference to the accompanying drawings.

As described above, the conventional technique has a problem that the consumption of a network bandwidth in a moving vehicle increases. As a technique of reducing the amount of data transmitted between devices, there is a technique of transmitting a hash value instead of data when transmitting the same data as data that has been sent in the past. However, such a technique has a possibility of a collision between hash values, and thus, it is difficult to use this technique for separation of causes of an accident. Although there is also a technique of recording by excluding redundant data of data streams of a file, such a technique can reduce the capacity of storage, but hardly lowers a utilization rate of network bandwidths.

In the communication system according to the present embodiment, difference information between a message serving as the basis of replication and a received message is recorded when it is determined that the received message has been replicated and transmitted. As the duplication of a message to be transmitted is excluded in this manner, it is possible to reduce the network bandwidths. Hereinafter, an example in which messages are transmitted and received in units of frames will be described, but the messages may be transmitted and received in any unit.

Figure 1:
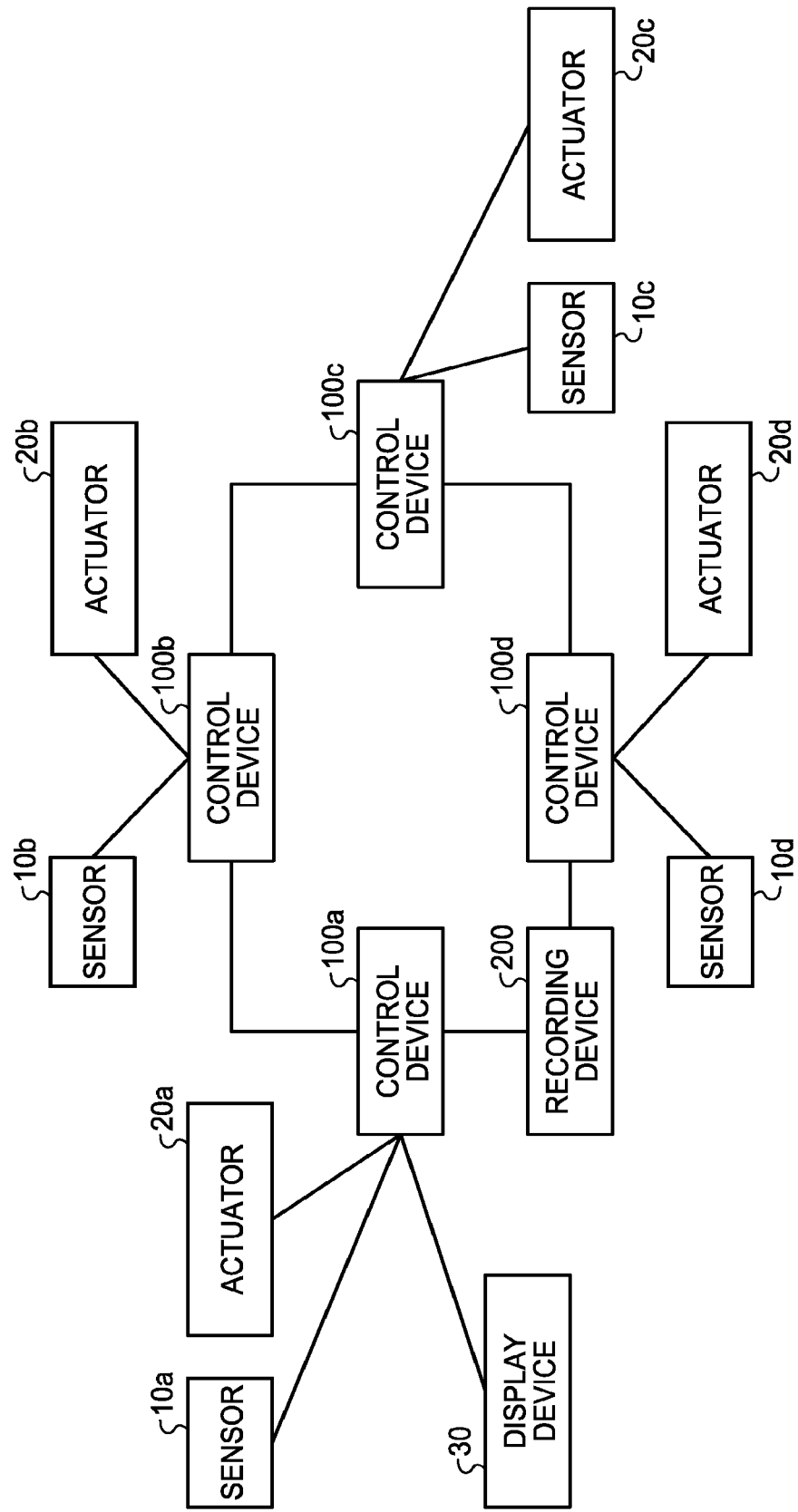
FIG. 1 is a block diagram of a communication system according to the present embodiment.

FIG. 1 is a block diagram illustrating a configuration example of the communication system including a control device and a recording device according to the present embodiment.

As illustrated in FIG. 1, the communication system of the present embodiment is configured such that control devices 100a to 100d, sensors 10a to 10d, actuators 20a to 20d, a display device 30, and a recording device 200 are connected via a network.

The control devices 100a to 100d have the same configuration, and thus, will be simply referred to as a control device 100 when there is no need for distinguishment. Similarly, when there is no need for distinguishment, sensors and actuators will be simply referred to as a sensor 10 and an actuator 20, respectively.

The sensor 10 outputs a detection signal to the connected control device 100. The sensor 10 is, for example, an acceleration sensor, a vehicle speed sensor, and a GPS sensor, but any other sensor may be used. The actuator 20 operates in accordance with control of the connected control device 100. At least one of the sensor 10 and the actuator 20 is not necessarily connected to the control device 100. Although the display device 30 is connected only to the control device 100a in FIG. 1, the display device 30 or another display device may be connected to the other control device 100.

The recording device 200 is connected between the plurality of control devices 100 (control devices 100a and 100d in FIG. 1).

The network used for connection among the respective devices is, for example, Ethernet (registered trademark), but is not limited thereto. For example, the control device 100 and the sensor 10, the actuator 20, and the display device 30 corresponding thereto may be connected via a network different from Ethernet.

In the present embodiment, the respective control devices 100 and the recording device 200 are connected in a ring type. A connection mode is not limited to the ring type, and any connection mode such as a mesh type, a star type, a full-connect type, a bus type, and a tree type may be used. It is preferable to use a connection mode in which at least one of redundantly transmitted frames passes through the recording device 200.

Incidentally, the above connection mode is not limited to a physical connection mode, but may be a connection mode formed using a virtual local area network (VLAN) defined by IEEE 802.1Q. It is assumed that the respective devices are time-synchronized according to a protocol such as precision time protocol (PTP) or gPTP (generalized-PTP) stipulated by a standard such as IEEE 1588 and IEEE 802.1AS.

In each of the control devices 100, an application operates to control the sensor 10, the actuator 20, the display device 30, and the like which are connected thereto. In addition, each of the control devices 100 has a function of transferring a frame received from the other control device 100 and the recording device 200, and transfers the frame addressed to another device. Similarly, the recording device 200 has a function of transferring a frame addressed to another device. In addition to such a function, the recording device 200 also has a function of recording the transferred frame and a function of accepting an instruction of frame recording from the control device 100 and recording the instructed information. The present embodiment can be applied to an in-vehicle network of a moving vehicle such as an aircraft, a train, and an automobile and an industrial network such as a factory and a plant.

Figure 2:
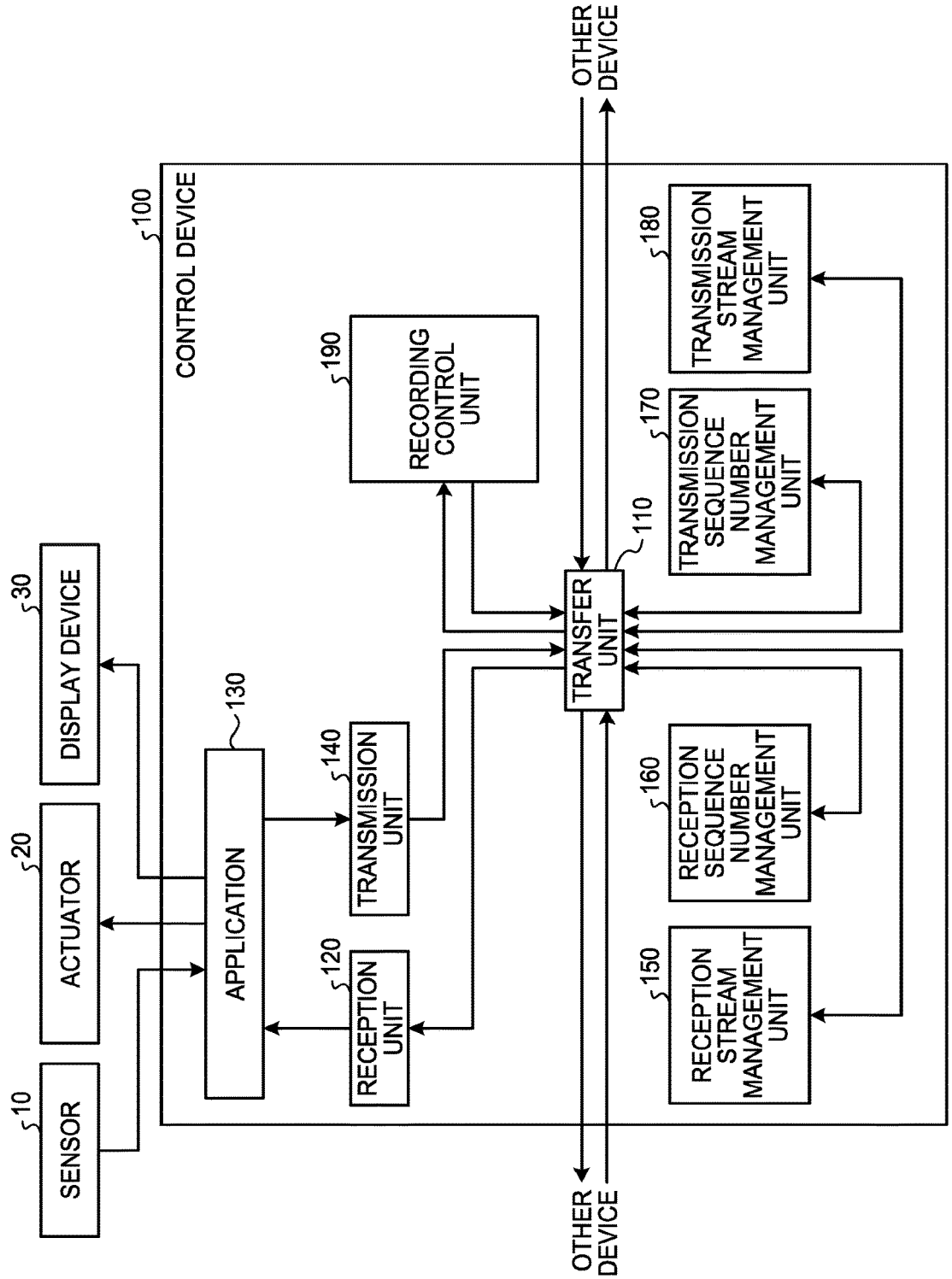
FIG. 2 is a block diagram of a control device according to the present embodiment.

FIG. 2 is a block diagram illustrating an example of a functional configuration of the control device 100 according to the present embodiment. As illustrated in FIG. 2, the control device 100 includes a transfer unit 110, a reception unit 120, an application 130, a transmission unit 140, a reception stream management unit 150, a reception sequence number management unit 160, a transmission sequence number management unit 170, a transmission stream management unit 180, and a recording control unit 190.

The transfer unit 110 transfers a frame to another device (the other control device 100 and the recording device 200). Details of functions of the transfer unit 110 will be described later.

The reception unit 120 receives a frame addressed to the own device from the transfer unit 110 and transfers the received frame to the application 130. The application 130 is connected to the sensor 10, the actuator 20, the display device 30, and the like, and controls these respective units. The transmission unit 140 passes the frame that the application 130 has transmitted to the other device to the transfer unit 110.

The reception stream management unit 150 manages a stream (flow) during frame duplication removal. The stream (flow) is flow of data in one direction from one transmission source to one or more transmission destinations, and data is stored in a frame and transmitted. Similarly, the reception sequence number management unit 160 manages a sequence number to be used during the frame duplication removal. The frame duplication removal is a process of removing duplication of a plurality of frames that have been replicated (duplicated) and transmitted when the transfer unit 110 receives the frames.

The reception stream management unit 150 refers to, for example, a removal table (to be described later) to determine whether to remove duplication of a received frame (reception frame). For example, the reception sequence number management unit 160 stores a sequence number of the received frame in storage (not illustrated) or the like for each stream and manages the stored sequence number.

The transmission stream management unit 180 manages a stream during frame replication. The transmission sequence number management unit 170 manages a sequence number during the frame replication. The frame replication is a process of replicating and transmitting a frame when transmitting a frame by the transfer unit 110.

The transmission stream management unit 180 refers to, for example, a replication transmission table (to be described later) to determine whether to replicate a frame to be transmitted and transmit the replicated frame. For example, the transmission sequence number management unit 170 stores a sequence number of the transmitted frame in storage (not illustrated) or the like for each stream and manages the stored sequence number.

The above-described functions of the reception stream management unit 150, the reception sequence number management unit 160, the transmission sequence number management unit 170, and the transmission stream management unit 180 are merely examples and may be appropriately changed in accordance with, for example, a standard to be applied (for example, IEEE 802.1CB).

The recording control unit 190 controls a process of instructing the recording device 200 to record the frame received by the transfer unit 110. Details of functions of the recording control unit 190 will be described later.

Figure 3:
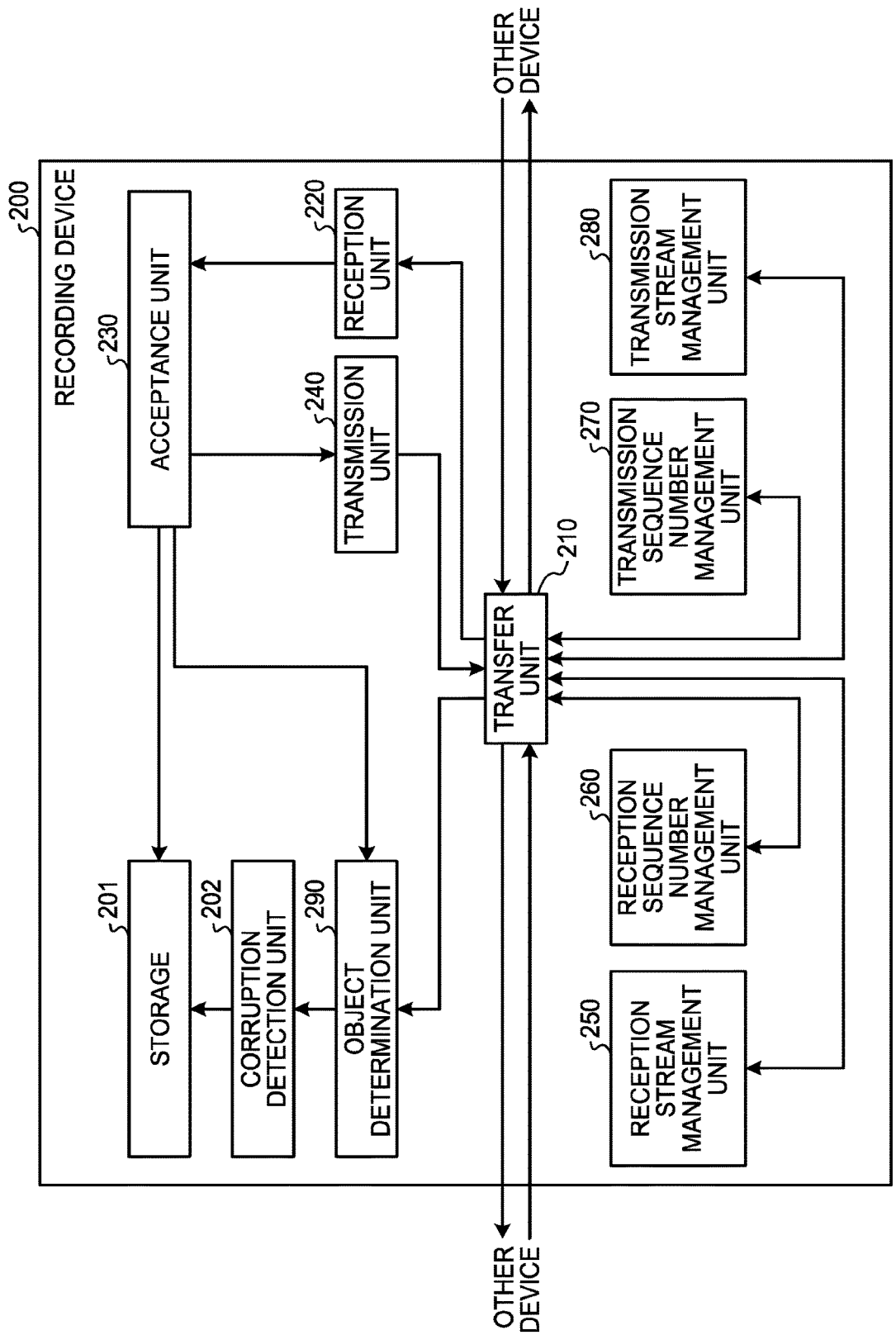
FIG. 3 is a block diagram of a recording device according to the present embodiment.

FIG. 3 is a block diagram illustrating an example of a functional configuration of the recording device 200 according to the present embodiment. As illustrated in FIG. 3, in the recording device 200 includes storage 201, a corruption detection unit 202, a transfer unit 210, a reception unit 220, an acceptance unit 230, a transmission unit 240, a reception stream management unit 250, a reception sequence number management unit 260, a transmission sequence number management unit 270, a transmission stream management unit 280, and an object determination unit 290.

The reception stream management unit 250, the reception sequence number management unit 260, the transmission sequence number management unit 270, and the transmission stream management unit 280 have the same functions as the reception stream management unit 150, the reception sequence number management unit 160, the transmission sequence number management unit 170, and the transmission stream management unit 180 of the control device 100, and thus, detailed descriptions thereof will be omitted.

The storage 201 records a frame flowing through the network. The storage 201 is, for example, a nonvolatile storage medium. For example, the storage 201 may be implemented by NAND flash memory or a solid state drive (SSD), a secure digital (SD) card, an embedded multi media card (eMMC), a universal flash storage (UFS), and the like using NAND flash memory as a storage medium.

The corruption detection unit 202 detects whether a received frame is corrupted using a frame checksum sequence (FCS) or the like. The transfer unit 210 transfers a frame to another device (the other control device 100).

The reception unit 220 receives a frame addressed to the own device from the transfer unit 210 and transfers the received frame to the acceptance unit 230. The acceptance unit 230 accepts a command from the other control device 100. For example, the acceptance unit 230 accepts a command (recording command) that instructs recording of frame information transmitted from the other control device 100 and an instruction to change a reference of an object to be recorded. When receiving the recording command, the acceptance unit 230 records information on the frame included in the command in the storage 201.

The transmission unit 240 receives a frame to be transmitted to the other control device 100 from the acceptance unit 230 or the like, and passes the received frame to the transfer unit 210.

The object determination unit 290 determines whether the frame transferred by the transfer unit 210 is an object to be recorded. For example, the object determination unit 290 can use a method of determining that a frame is an object to be recorded in the case of the frame duplicated according to IEEE 802.1CB or the like, a method of determining that a frame is an object to be recorded when a traffic class of time sensitive networking (TSN) or a priority of a VLAN (a value of a priority code point) is equal to or greater than a fixed value, a method of setting information that indicates whether to obtain an object to be recorded for each stream and making a determination by referring to this information, and the like.

It may be configured such that a determination method and a reference to be used for determination (the fixed value to be compared with the priority, the setting for each stream, or the like) of the object determination unit 290 can be changed by a command accepted from the other control device 100. The frame that has been determined to be recorded by the object determination unit 290 is recorded in the storage 201 together with identification information of the frame, a reception time, and information of a received communication unit (to be described later).

Incidentally, the respective units (the transfer unit 110, the reception unit 120, the application 130, the transmission unit 140, the reception stream management unit 150, the reception sequence number management unit 160, the transmission sequence number management unit 170, the transmission stream management unit 180, and the recording control unit 190) of the control device 100 and the respective units (the transfer unit 210, the reception unit 220, the acceptance unit 230, the transmission unit 240, the reception stream management unit 250, the reception sequence number management unit 260, the transmission sequence number management unit 270, the transmission stream management unit 280, and the object determination unit 290) of the recording device 200 are implemented by, for example, one or a plurality of processors and memories. For example, the above-described respective units may be implemented by causing a processor such as a central processing unit (CPU) to execute a program, that is, software. The above-described respective units may be implemented by a processor such as a dedicated integrated circuit (IC), that is, hardware. The above-described respective units may be implemented using both the software and the hardware in combination. In the case of using the plurality of processors, each of the processors may implement one of the respective units, or may implement two or more of the respective units.

Figure 4:
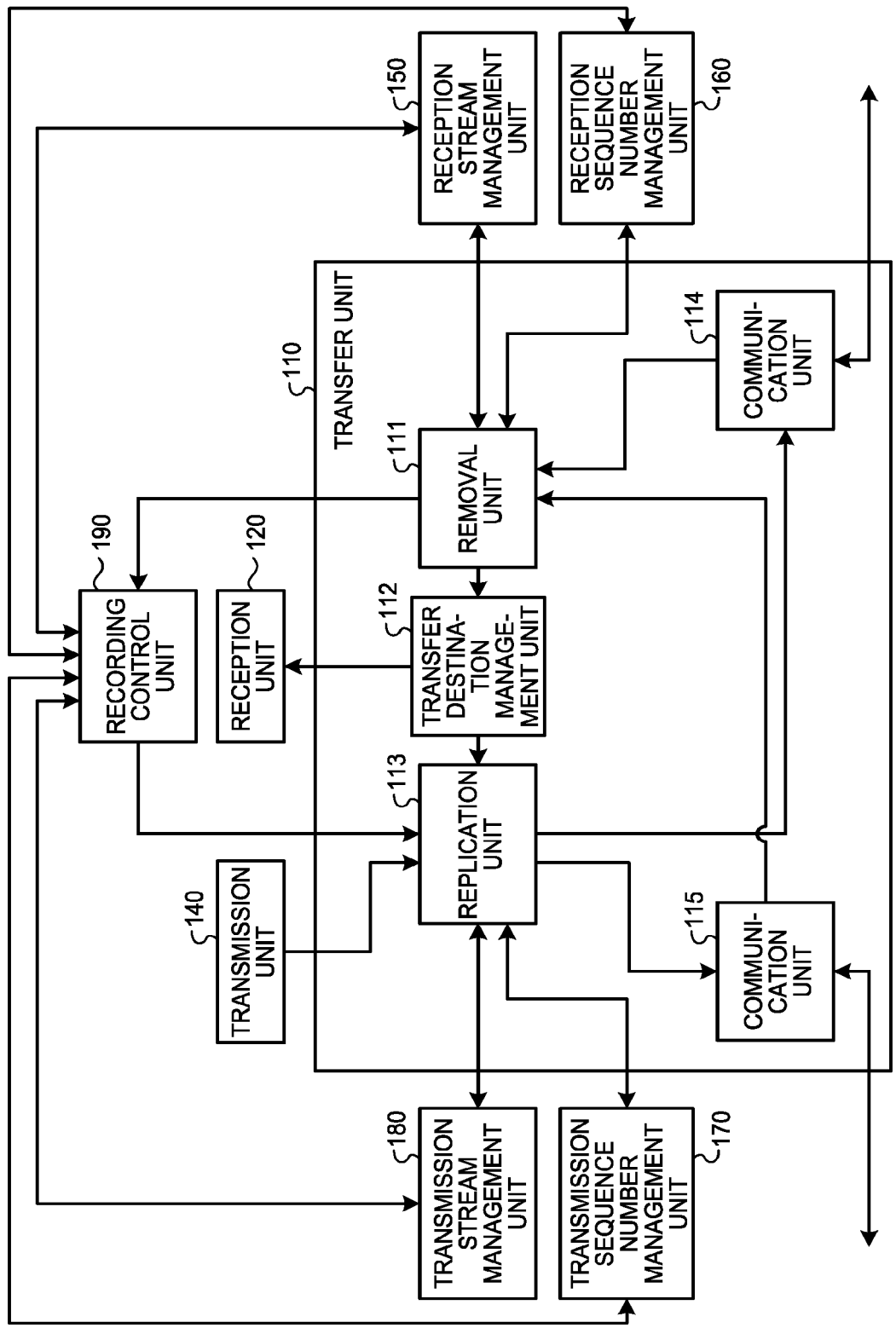
FIG. 4 is a block diagram of a transfer unit of the control device.

Next, the functions of the transfer unit 110 of the control device 100 will be described in detail. FIG. 4 is a block diagram illustrating a functional configuration example of the transfer unit 110 of the control device 100. Incidentally, FIG. 4 also illustrates some configurations other than the transfer unit 110. As illustrated in FIG. 4, the transfer unit 110 includes a removal unit 111, a transfer destination management unit 112, a replication unit 113, and communication units 114 and 115.

The transfer unit 110 is implemented by a switch chip compliant with the IEEE 802.1CB standard, for example.

The communication units 114 and 115 communicate with the other control device 100 and the recording device 200. The communication units 114 and 115 have functions of a physical layer and a MAC media access control (MAC) sublayer of a data link layer. The communication units 114 and 115 have a function of passing a frame along with occurrence of an error when the error is detected as a result of confirming an FCS by the function of the MAC sublayer. In addition, the communication units 114 and 115 have a function of assigning a time stamp of a reception time to the received frame.

The removal unit 111 removes a duplicated frame when the received frame is a frame that has been replicated and transmitted. For example, the removal unit 111 performs duplication removal of the frame that has been replicated and transmitted by another device based on information from the reception stream management unit 150 and the reception sequence number management unit 160. The removal unit 111 does not perform the duplication removal for a stream for which duplication removal has not been set by the reception stream management unit 150. In addition, the removal unit 111 passes the frame before being subjected to removal to the recording control unit 190.

The transfer destination management unit 112 manages a transfer destination of a received frame. For example, the transfer destination management unit 112 learns a transmission source address of the received frame for each VLAN ID, and selects whether to pass the frame to either or both of the communication units 114 and 115 and the reception unit 120. If there is a port learning a transmission destination address of the received frame and the VLAN ID, the frame is passed to the port. The frame is passed to all the ports if there is no port learning the transmission destination address and the VLAN ID. The transfer destination management unit 112 passes a frame from which duplication has been removed by the removal unit 111 to a transfer destination selected between the reception unit 120 and the replication unit 113.

When it is necessary to perform replication of a frame to be transmitted, the replication unit 113 replicates the frame and transmits the replicated frame. For example, the replication unit 113 determines whether to replicate the frame based on information from the transmission stream management unit 180 and the transmission sequence number management unit 170, and replicates the frame transmits the replicated frame when performing the replication. The replication unit 113 does not replicate a frame for which replication has not been set by the transmission stream management unit 180. In addition, the replication unit 113 accepts transmission of a frame in response to a request from the transmission unit 140 and the recording control unit 190 in addition to the transfer destination management unit 112.

Here, the example of including two communication units of the communication units 114 and 115 is illustrated, but three or more communication units may be provided. For example, in the case of the mesh-type connection mode, it may be configured such that one communication unit is provided for each of the other control devices 100 and the recording device 200 which are connected thereto.

Figure 5:
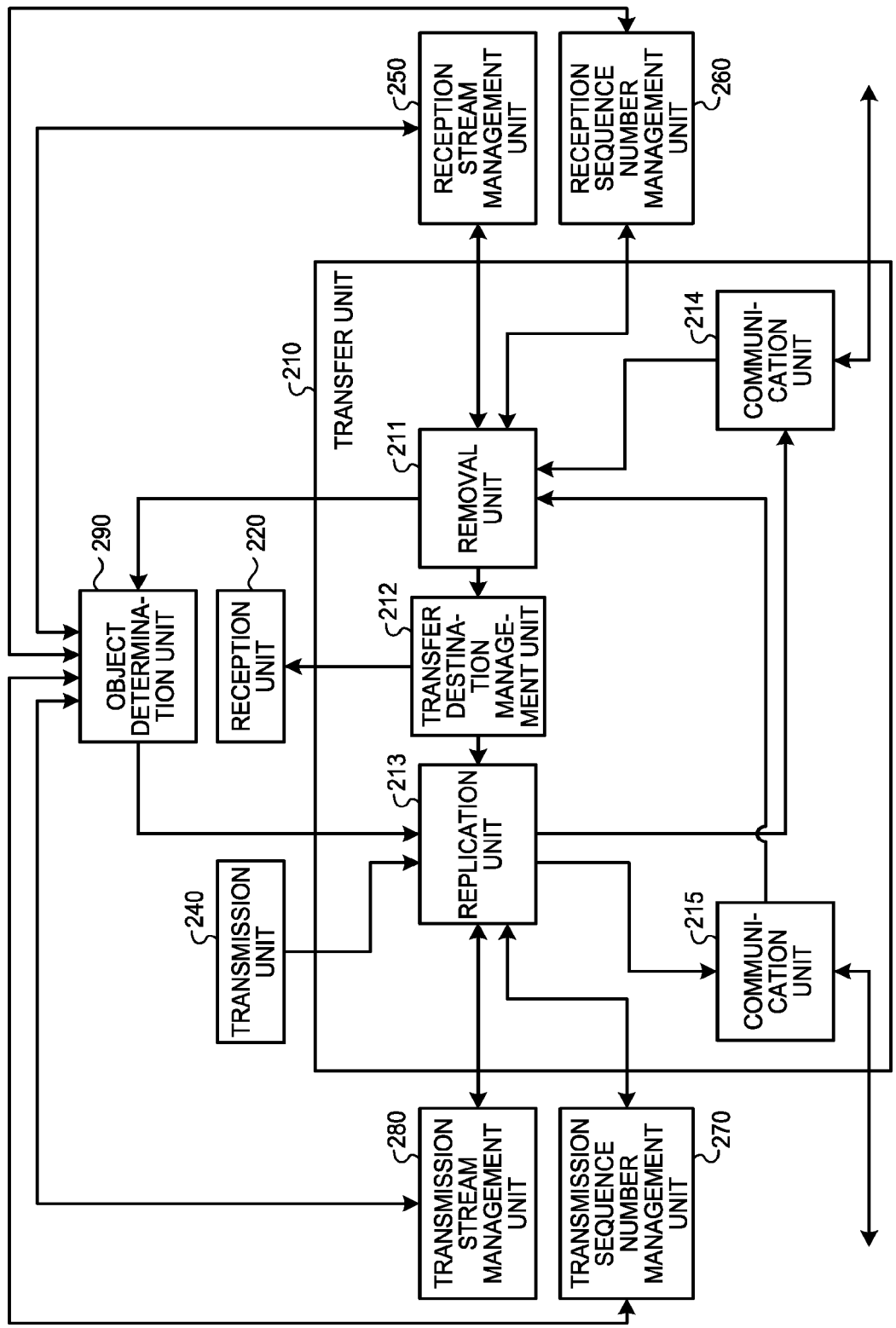
FIG. 5 is a block diagram of a transfer unit of the recording device.

Next, the functions of the transfer unit 210 of the recording device 200 will be described in detail. FIG. 5 is a block diagram illustrating a functional configuration example of the transfer unit 210 of the recording device 200. Incidentally, FIG. 5 also illustrates some configurations other than the transfer unit 210. As illustrated in FIG. 5, the transfer unit 210 includes a removal unit 211, a transfer destination management unit 212, a replication unit 213, and communication units 214 and 215.

The transfer unit 210 is different from the transfer unit 110 of the control device 100 in terms that a frame before being subjected to a removal process executed by the removal unit 211 is passed to the object determination unit 290 instead of the recording control unit 190. Other functions of the removal unit 211, the transfer destination management unit 212, the replication unit 213, and the communication units 214 and 215 are the same as those of the removal unit 111, the transfer destination management unit 112, the replication unit 113, and the communication units 114 and 115 included in the transfer unit 110 of the control device 100, and thus, detailed descriptions thereof will be omitted.

Figure 6:
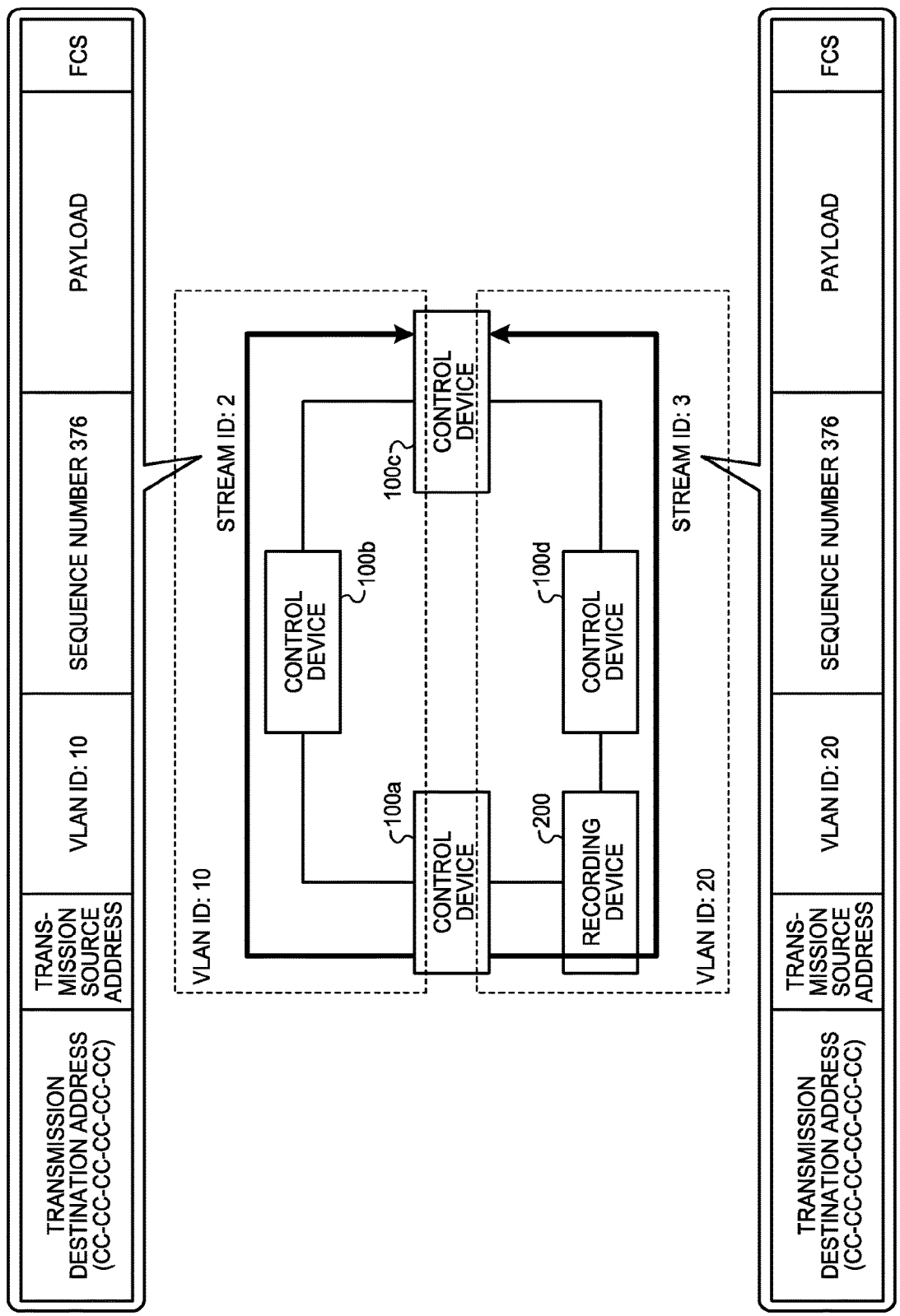
FIG. 6 is a diagram illustrating an example of redundant transmission in a plurality of streams.

Next, a specific example of a configuration in which a frame is redundantly transmitted in a plurality of streams will be described. FIG. 6 is a diagram illustrating an example of redundancy transmission from the control device 100a to the control device 100c in the plurality of streams. Here, it is assumed that two VLANs (VLAN ID: 10 and VLAN ID: 20) are set in order to simplify the description although it is possible to flow various streams at the same time. The VLAN whose VLAN ID is "10" is a VLAN to which a frame is transferred from the control device 100a to the control device 100c through the control device 100b. The VLAN whose VLAN ID is "20" is a VLAN to which a frame is transferred from the control device 100a to the control device 100c through the control device 100d.

In this environment, the frame duplication and removal are performed using the method defined by IEEE 802.1CB to implement a highly-reliable network. In the IEEE 802.1CB, for example, a stream is identified by the following method.

Combination of Transmission Destination MAC Address and VLAN ID

Combination of transmission source MAC Address and VLAN ID

The method of identifying the stream is not limited to the above method. For example, concepts such as an address of a high internet protocol (IP) layer and a port number or the like of a protocol of a higher layer may be combined. In addition, the transmission destination MAC address, the transmission source MAC address, and the VLAN ID may be combined.

Figure 7:
FIG. 7 is a table illustrating an example of a replication transmission table.

The control device 100a refers to the replication transmission table to determine whether to replicate the frame and transmit the replicated frame. FIG. 7 is a table illustrating an example of a replication transmission table used by the transmission stream management unit 180.

The replication transmission table in FIG. 7 has a format in which one stream (the left side of the arrow) is associated with a plurality of streams (the right side of the arrow). The replication transmission table of FIG. 7 determines that a frame designated to be transmitted in a stream with stream ID: 1 is replicated and transmitted in two streams with stream ID: 2 and stream ID: 3.

The stream ID: 1 is assigned to the stream whose transmission destination MAC address (MAC address used by the application 130 of the control device 100c) is "CC-CC-CC-CC-CC-CC" and whose VLAN ID is "100". The stream ID: 2 is assigned to the stream whose transmission destination MAC address is "CC-CC-CC-CC-CC-CC" and whose VLAN ID is "10". The stream ID: 3 is assigned to the stream whose transmission destination MAC address is "CC-CC-CC-CC-CC-CC" and whose VLAN ID is "20".

In this manner, the stream ID is a value assigned for each combination of a MAC address and a VLAN ID. The stream ID can be used as identification information (stream identifier) to identify a stream. The stream may be identified by the combination of the MAC address and the VLAN ID without using the stream ID.

Figure 8:
FIG. 8 is a table illustrating an example of a removal table.

The control device 100c refers to the removal table to determine whether to remove duplication of frames. FIG. 8 is a table illustrating an example of the removal table used by the reception stream management unit 150.

The removal table of FIG. 8 has a format in which a plurality of streams (the left side of the arrow) is associated with one stream (the right side of the arrow). The removal table of FIG. 8 determines that the frames received in the stream ID: 2 and the stream stream ID: 3 are duplicated, and thus, is handled as the frame with the stream ID: 1 by removing the duplication.

Returning to FIG. 6, it is assumed that the application 130 of the control device 100a has transmitted a frame with the transmission destination MAC set to "CC-CC-CC-CC-CC-CC" and the VLAN ID set to "100". The transfer unit 110 (replication unit 113) of the control device 100a refers to the replication transmission table as illustrated in FIG. 7, and determines that it is necessary to perform replication since this frame belongs to the stream with the stream ID: 1. The transfer unit 110 replicates this frame and transmits the replicated frame as the stream (stream ID: 2) with the VLAN ID of "10" and the stream (stream ID: 3) with the VLAN ID of "20". At this time, the transfer unit 110 assigns the same sequence number ("376" in the example of FIG. 6) to indicate that these frames are the same and transmit the replicated frame.

FIG. 9 is a view illustrating a format example of a frame. As illustrated in FIG. 9, the frame includes a transmission destination MAC address, a transmission source MAC address, a VLAN tag, a redundancy tag, a type/length, data, and an FCS.

The transfer unit 110 assigns a sequence number to be managed for each stream by the transmission sequence number management unit 170 to a sequence number field of the redundancy tag and transmits the resultant. In the example of FIG. 6, the transfer unit 110 assigns "376" which is the same for the replicated frame. The FCS is changed by assigning the VLAN ID and the redundancy tag. Therefore, the transfer unit 110 calculates the FCS and assigns the calculated FCS. The transfer unit 110 (removal unit 111) of the control device 100c refers to the removal table as illustrated in FIG. 8, and removes duplication of frames that have been replicated and transmitted.

The duplication removal is performed using the sequence number included in the redundancy tag assigned at the time of transmission. The reception sequence number management unit 160 of the control device 100c manages a sequence number received for each stream. The transfer unit 110 (removal unit 111) removes a frame with a sequence number that has been already received. For example, the removal unit 111 removes a redundancy tag from a frame that has arrived first and rewrites a VLAN ID to "100". The frame from which duplication has been removed is passed to the application 130 via the reception unit 120. When the same sequence number is received thereafter, the removal unit 111 discards the frame. Incidentally, the removal unit 111 may pass the first frame in which an FCS checksum error has not occurred.

Figure 10:
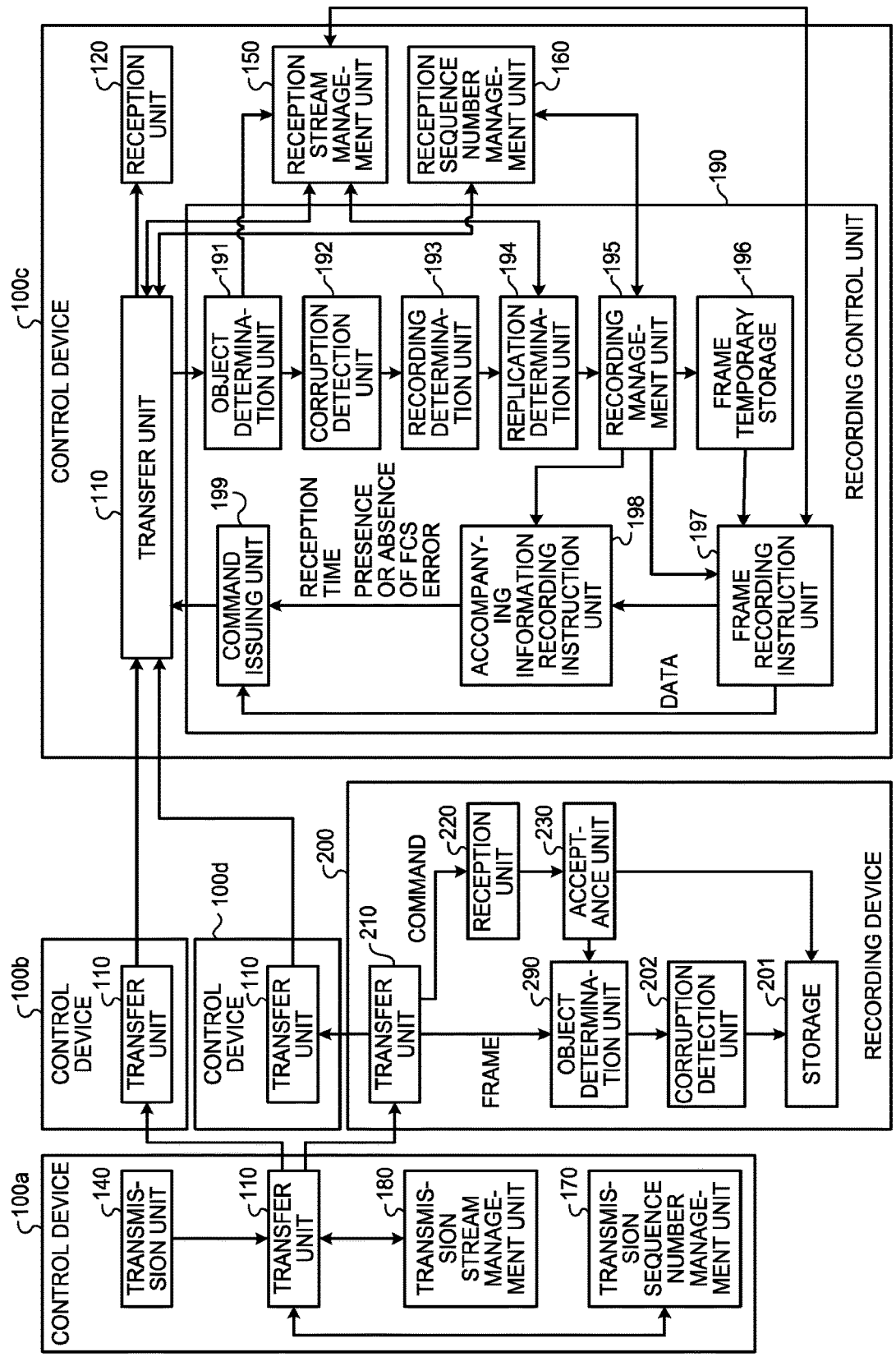
FIG. 10 is a block diagram of a recording control unit.

Next, the functions of the recording control unit 190 will be described in detail. FIG. 10 is a block diagram illustrating a functional configuration example of the recording control unit 190. Incidentally, FIG. 10 also illustrates configurations of the respective devices (the control devices 100a, 100b, 100c, and the recording device 200) centered on the recording control unit 190 of the control device 100c. Some functions are not illustrated in order for simplicity.

FIG. 10 illustrates an example of flow of a frame, data, and the like when the frame is transmitted as follows. First, the control device 100a transmits a frame via the transmission unit 140 according to an instruction from the application 130. Here, the frame with the VLAN ID of "100" is transmitted to the application 130 (MAC address: "CC-CC-CC-CC-CC-CC") of the control device 100c as described with reference to FIG. 6. The frame transmitted from the transmission unit 140 is replicated and transmitted by the transfer unit 110. Specifically, the frame with the VLAN ID of "10" is sent to the transfer unit 110 of the control device 100c via the control device 100b. In addition, the frame with the VLAN ID of "20" is sent to the transfer unit 110 of the control device 100c via the transfer unit 210 of the recording device 200 and the transfer unit 110 of the control device 100d.

As illustrated in FIG. 10, the recording control unit 190 includes an object determination unit 191, a corruption detection unit 192, a recording determination unit 193, a replication determination unit 194, a recording management unit 195, frame temporary storage 196, a frame recording instruction unit 197, an accompanying information recording instruction unit 198, and a command issuing unit 199.

The object determination unit 191 receives a frame before being subjected to the removal process from the transfer unit 110 and determines whether the received frame is a preset object to be recorded.

The corruption detection unit 192 detects whether the received frame is not corrupted using an FCS or the like.

The recording determination unit 193 determines whether the received frame or the replicated frame is recorded in the recording device 200.

The replication determination unit 194 determines whether the received frame is a replicated and transmitted frame.

The recording management unit 195 executes management of the frame temporary storage 196, instruction of recording with respect to the frame recording instruction unit 197 and the accompanying information recording instruction unit 198, and the like.

The frame temporary storage 196 is a storage medium that temporarily holds information of a received frame. The frame temporary storage 196 is implemented by, for example, dynamic random access memory (DRAM) or the like.

The frame recording instruction unit 197 instructs to record information of a frame in the recording device 200. The accompanying information recording instruction unit 198 instructs to record information (frame accompanying information) accompanying to a frame in the recording device 200. The frame recording instruction unit 197 and the accompanying information recording instruction unit 198 are examples of a recording instruction unit.

The command issuing unit 199 issues a command to record the frame information and the frame accompanying information in the recording device 200.

Figure 11:
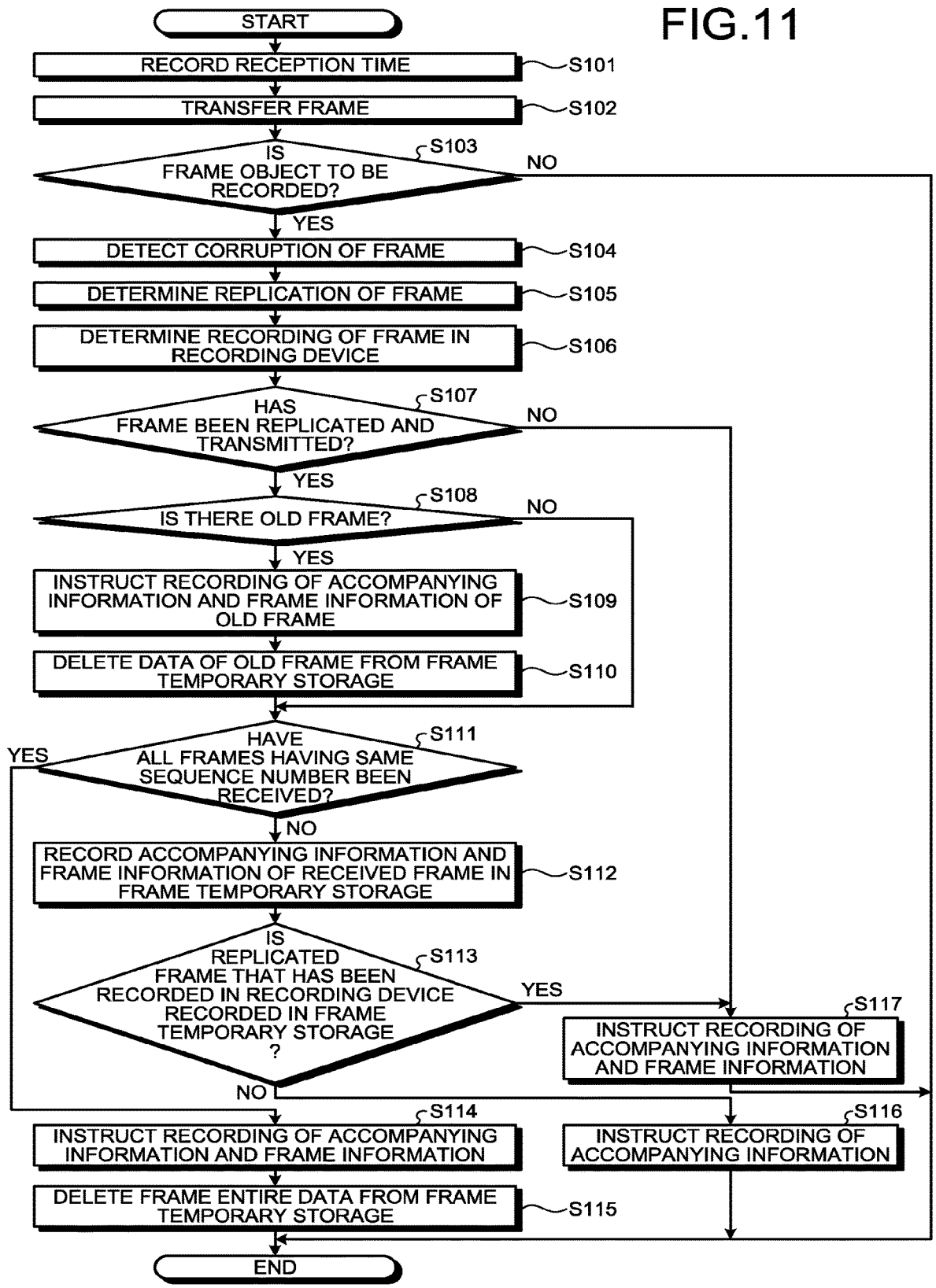
FIG. 11 is a flowchart of a recording control process according to the present embodiment.

Next, a recording control process executed by the control device 100 according to the present embodiment will be described. FIG. 11 is a flowchart illustrating an example of the recording control process according to the present embodiment. Hereinafter, a description will be given regarding a case where the control device 100c that receives frames in a plurality of streams from the control device 100a serves as the main device, as an example, similarly to FIGS. 6 and 10.

The communication unit (the communication unit 114 or the communication unit 115) of the control device 100c receives a frame from the control device 100b or the control device 100d. The communication unit records information (such as a number of a port allocated to the communication unit) indicating any communication unit from which the frame has been received, and a time stamp indicating the time at which the frame has been received in storage or the like provided in the control device 100 (Step S101). The time stamp is assigned using a value that is time-synchronized according to, for example, PTP or gPTP.

Next, the transfer unit 110 executes a transfer process of transferring the received frame (Step S102). The transfer process includes the following processing.

First, the removal unit 111 in the transfer unit 110 refers to the removal table or the like managed by the reception stream management unit 150 and determines whether the received frame is an object to be removed. When the frame is the object to be removed, the removal unit 111 removes duplication while using information of an already-received sequence number managed by the reception sequence number management unit 160. The removal unit 111 rewrites a transmission destination MAC address and rewrites a VLAN ID as necessary, and outputs the frame after having been subjected to the removal process to the transfer destination management unit 112.

In the example of FIG. 6, the frame with the VLAN ID of "10" and the frame with the VLAN ID of "20" for which the transmission destination address has been set to the application 130 of the control device 100c are rewritten to have the VLAN ID of "100" and output to the reception unit 120. If the transmission destination address is not the address of the application 130 of the control device 100c, the frame is transferred to the other device via the replication unit 113 and the communication unit 114 or 115. On the other hand, the removal unit 111 has a function of delivering the frame before being subjected to the removal process to the recording control unit 190.

The recording control unit 190, which has received the frame before being subjected to the removal process from the removal unit 111, executes the following process. First, the object determination unit 191 of the recording control unit 190 determines whether the received frame is a frame that has been preset to be recorded (Step S103). When the frame is not the object to be recorded (Step S103: No), the processing is terminated without recording the frame accompanying information and the frame information. Details of the determination process of determining whether a frame is an object to be recorded will be described later.

If it is determined that the frame is the object to be recorded (Step S103: Yes), the corruption detection unit 192 checks an FCS to detect whether the frame is corrupted (Step S104). If an error occurs as a result of the FCS check, the corruption detection unit 192 records that the FCS error has occurred in the frame.

Next, the replication determination unit 194 determines whether the received frame has been replicated and transmitted (Step S105). The replication determination unit 194 can make this determination, for example, by referring to information of the removal table managed by the reception stream management unit 150. For example, referring to the information of the removal table illustrated in FIG. 8, the replication determination unit 194 can determine that the received frame has been replicated and transmitted when the transmission destination MAC address is addressed to "CC-CC-CC-CC-CC-CC" and the VLAN ID is "10" or "20".

The recording determination unit 193 determines whether the received frame or the replicated frame is recorded in the recording device 200 (Step S106). For example, the recording determination unit 193 can make this determination based on whether the received frame or the replicated frame has passed through the transfer unit 210 of the recording device 200 and is set as the object to be recorded by the object determination unit 290 of the recording device 200. When the frame satisfies both of these conditions, the recording determination unit 193 determines that the frame is recorded in the recording device 200. In the opposite case, the recording determination unit 193 determines that the frame is not recorded in recording device 200. The determination result is recorded in the field, "Recording in Recording Device" (to be described later) of the frame temporary storage 196.

Whether to pass through the transfer unit 210 of the recording device 200 can be determined by setting information or the like that indicates a connection relationship with the recording device 200 in advance and referring to the set information, for example, when the network configuration is fixed. For example, information indicating whether to set a frame as an object to be recorded may be set for each combination of an MAC address, a VLAN ID, and a port number of a device as a transmission source, and the recording determination unit 193 may make the determination by referring to this information.

When the network configuration is not fixed, a topology of the network may be detected using a protocol to collect information on a neighboring device such as a link layer discovery protocol (LLDP) and the determination may be made based on an MAC address of the recording device 200.

The setting to indicate whether it is determined as the object to be recorded by the object determination unit 290 of the recording device 200 may be shared among the plurality of control devices 100. In addition, the setting of the object determination unit 290 of the recording device 200 may be referred to or changed by the control device 100c through a command.

When the determination in Steps S105 and S106 is completed, processing of the recording management unit 195 is performed. First, the recording management unit 195 determines whether it is determined that the received frame has been replicated in the determination of Step S105 (Step S107). If the frame has not been replicated (Step S107: No), the recording management unit 195 instructs the frame recording instruction unit 197 and the accompanying information recording instruction unit 198 to record frame accompanying information and frame information of the received frame (Step S117). Details of these processes will be described later.

When the received frame has been replicated and transmitted (Step S107: Yes), the recording management unit 195 determines whether an old frame is stored in the frame temporary storage 196 (Step S108). For example, the recording management unit 195 determines whether there is data of a frame, which has a sequence number older, by a fixed value or more, than a sequence number of the received frame serving a reference in a stream to which the received frame belongs or a stream to which a replicated frame of the received frame belongs, recorded in the frame temporary storage 196.

For example, when the sequence number of the received frame is "378", the recording management unit 195 determines whether there is data of a frame having a sequence number older than 378 by 10 or more in the stream to which the received frame belongs or the stream to which the replicated frame thereof belongs. When there is data of the corresponding frame (Step S108: Yes), the recording management unit 195 instructs the frame recording instruction unit 197 and the accompanying information recording instruction unit 198 to record frame information on the frame having the old sequence number for which a frame information recording instruction has not been issued (Step S109). Incidentally, when all frames having the same sequence number are not gathered at this time, the recording management unit 195 may instruct to record the frame accompanying information storing a special value indicating no reception at a reception time for a frame that is planned to be received. Then, the recording management unit 195 deletes the data for which recording has been instructed from the frame temporary storage 196 (Step S110).

When the old frame is not stored (Step S108: No) and after deletion of the old frame, the recording management unit 195 refers to the frame temporary storage 196 and determines whether all the frames having the same sequence number due to replication have been received (Step S111). When all the frames have been received (Step S111: Yes), the recording management unit 195 instructs the frame recording instruction unit 197 and the accompanying information recording instruction unit 198 to record the frame accompanying information and the frame information (Step S114). In addition, the recording management unit 195 deletes the replicated data having the same sequence number from the frame temporary storage 196 (Step S115).

When all the frames have not been received (Step S111: No), the recording management unit 195 records the frame data and frame accompanying information in the frame temporary storage 196 (Step S112).

Next, the recording management unit 195 determines whether there is a frame recorded in the recording device 200 among the received frames or the replicated frames of the received frames stored in the frame temporary storage 196 in the determination of Step S106 (Step S113). When the frame is present (Step S113: Yes), the recording management unit 195 instructs the frame recording instruction unit 197 and the accompanying information recording instruction unit 198 to record frame accompanying information and frame information of the received frame (Step S117). When there is no frame (Step S113: No), the recording management unit 195 instructs the accompanying information recording instruction unit 198 to record only the frame accompanying information (Step S116). For example, this determination may refer to the field, "Recording in Recording Device", and it may be determined that there is a frame recorded in the recording device 200 when there is a record in the recording device 200.

Figure 12:
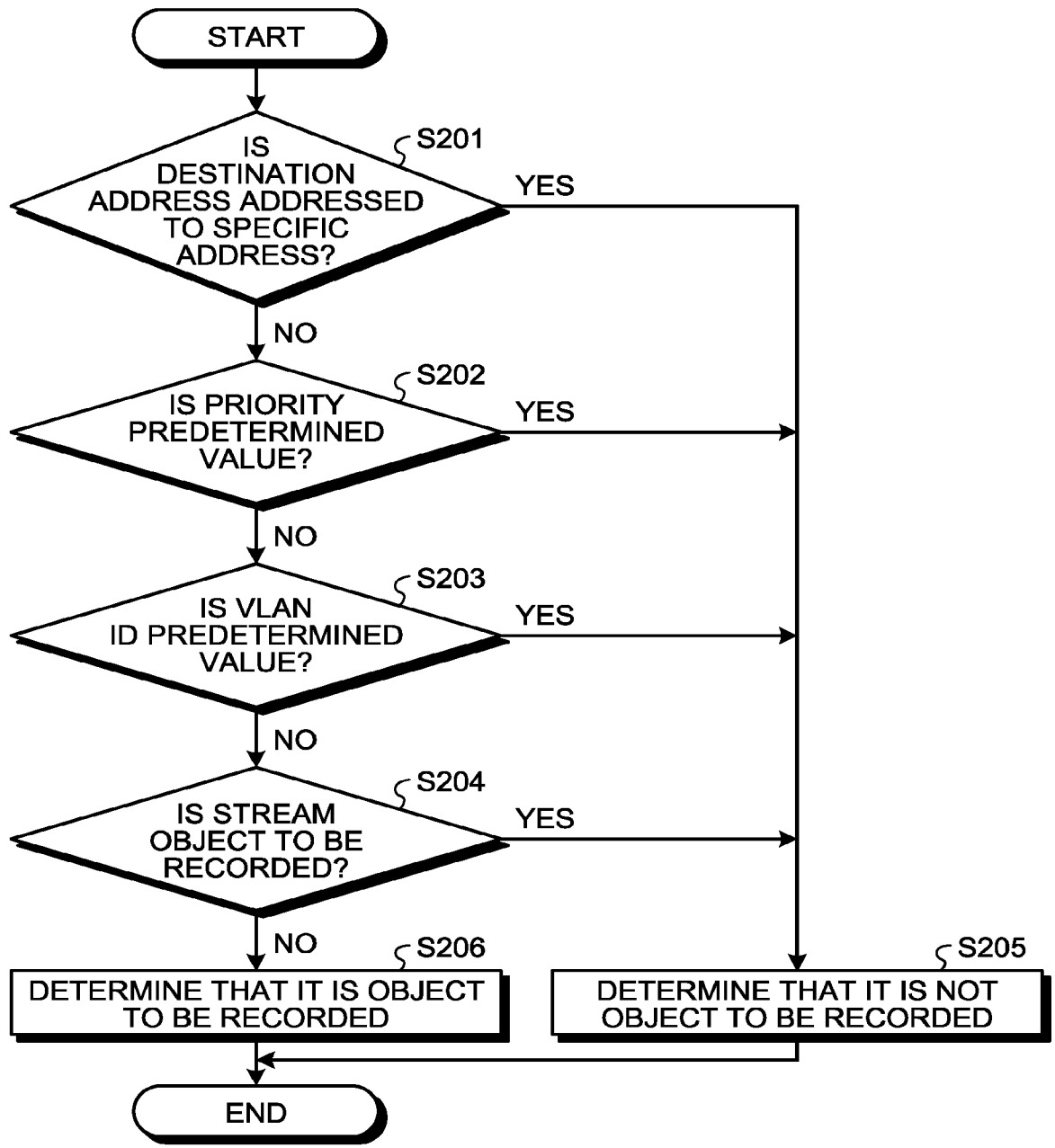
FIG. 12 is a flowchart of a recording determination process executed by an object determination unit.

Next, a recording determination process of determining whether a frame is an object to be recorded by the object determination unit 191 will be described. FIG. 12 is a flowchart illustrating an example of the recording determination process executed by the object determination unit 191.

The object determination unit 191 first determines whether a destination address of a received frame is addressed to a specific address (Step S201). When it is addressed to the specific address (Step S201: Yes), the object determination unit 191 determines that the received frame is an object to be recorded (Step S205). When it is not addressed to the specific address (Step S201: No), the object determination unit 191 further determines whether a priority, for example, a value of a priority code point (PCP) included in the received frame is a predetermined value (Step S202). When the PCP is the predetermined value (Step S202: Yes), the object determination unit 191 determines that the received frame is the object to be recorded (Step S205).

When the PCP is not the predetermined value (Step S202: No), the object determination unit 191 further determines whether a VLAN ID of the received frame is a predetermined value (ID) as the object to be recorded (Step S203). When it is the predetermined value (Step S203: Yes), the object determination unit 191 determines that the received frame is the object to be recorded (Step S205).

When the VLAN ID is not the predetermined value (Step S203: No), the object determination unit 191 further determines whether a received stream is an object to be recorded (Step S204). As described above, there are several methods as a method of identifying the stream. For example, the stream is identified by a combination of a MAC address and a VLAN. The object determination unit 191 determines that the received stream is the object to be recorded when the received stream is a predetermined stream as the object to be recorded. For example, when a frame is replicated and transmitted, a frame designated to remove a redundant frame may be set as the object to be recorded.

When the stream is the object to be recorded (Step S204: Yes), the object determination unit 191 determines that the received frame is the object to be recorded (Step S205). When the stream is not the object to be recorded (Step S204: No), the object determination unit 191 determines that the received frame is not the object to be recorded (Step S206) and ends the recording determination process. In this case, the frame accompanying information and the frame information of the received frame are not recorded.

Incidentally, the recording determination process of FIG. 12 is an example, and at least some of the above four determinations (Steps S201 to S204) may be executed, or whether a frame is an object to be recorded may be determined by another method.

As illustrated in FIG. 11, the control device 100 executes a process of deleting old frame data from the frame temporary storage 196 (Steps S108 to S110). As a result, it is possible to avoid a shortage of a storage area due to accumulation of unnecessary data in the frame temporary storage 196. Meanwhile, since the process of FIG. 11 is executed at the time of receiving a frame, the deletion of unnecessary data is not performed when a frame is not received. Therefore, it may be configured to confirm whether there is old data periodically, for example, independently of reception of a frame.

FIG. 13 is a flowchart illustrating an example of timer processing executed by the control device 100 configured as described above. The timer processing is, for example, a process of confirming and deleting old data in the frame temporary storage 196 which is executed by the recording management unit 195 at predetermined fixed intervals. In the timer processing, processing to record that a frame has not arrived within a fixed time is performed in a stream in which communication is stopped.

When the timer processing is started, the recording management unit 195 determines where is data for which all frames are not gathered although a predetermined time has elapsed from a reception time of a first frame from the frame temporary storage 196 (Step S301). When there is no such data (Step S301: No), the timer processing is ended.

When there is such data (Step S301: Yes), the recording management unit 195 instructs recording of frame accompanying information and frame information (Step S302). At this time, the recording management unit 195 may record a reception time of the frame that has not be received within the time together with the special value indicating no reception. The recording management unit 195 deletes the data of the frame for which recording has been instructed from the frame temporary storage 196 (Step S303).

FIG. 14 is a table illustrating an example of recording a frame in the frame temporary storage 196. As illustrated in FIG. 14, a stream identifier, a sequence number, a reception time, presence or absence of recording in the recording device 200, presence or absence of an FCS error, a reception port number, frame entire data, and whether recording of frame information has been instructed are saved for each frame.

In this example, the stream identifier is a combination of a transmission destination MAC address and a VLAN ID. The sequence number is a sequence number assigned to a frame. The reception time is a value of a time stamp assigned by the communication unit 114 or 115.

The recording in the recording device 200 is a result of determining whether the received frame is recorded in the recording device 200 by the recording determination unit 193. The FCS error is a result of the error check performed by the corruption detection unit 192. The reception port number is an identifier indicating any communication unit (reception port) from which a frame has been received. The frame entire data is data of a frame itself and includes, for example, a length of the frame and data constituting the frame. A frame information recording instruction indicates whether frame information of the frame has been instructed to be recorded in the recording device 200. One row corresponds to data of one frame.

Next, the recording of frame accompanying information and frame information will be described. When the recording of frame accompanying information and frame information is instructed, the command issuing unit 199 issues a command to the recording device 200 via the network. At this time, the command issuing unit 199 may use any protocol.

It is assumed that a MAC address ("EE-EE-EE-EE-EE-EE") of the recording device 200 is held in advance in the control device 100. Although the command issuing unit 199 may issue a command using any VLAN, it is preferable to set the command issuing unit 199 such that the command is not to be recorded by the control device 100.

Figure 15:
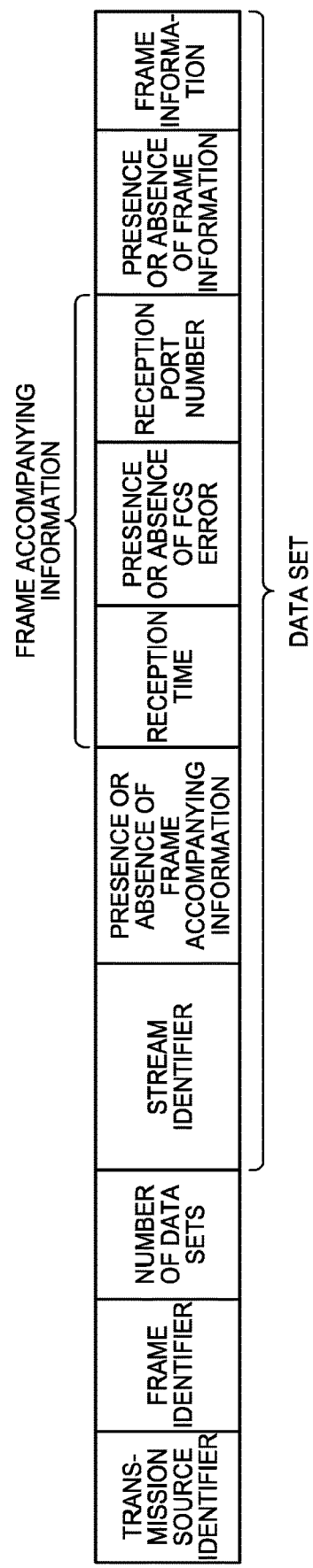
FIG. 15 is a view illustrating an example of a command when a frame is not replicated.

FIG. 15 is a view illustrating an example of the command when a frame is not replicated. In this example, the command includes a transmission source identifier, a frame identifier, the number of data sets, and a data set. It is possible to consecutively store data sets corresponding to the number of data sets. The data set includes a stream identifier, presence or absence of frame accompanying information, frame accompanying information, presence or absence of frame information, and frame information. The transmission source identifier is information to identify an issuer of this command. For example, a MAC address used in the control device 100c can be used as the transmission source identifier. As the transmission source identifier, a MAC address assigned to a switch constituting the transfer unit 110 may be used. In the present embodiment, the description is given assuming that "DD-DD-DD-DD-DD-DD" is used as the transmission source identifier. The frame identifier is information to uniquely identify a replicated frame by the recording device 200.

Figure 16:
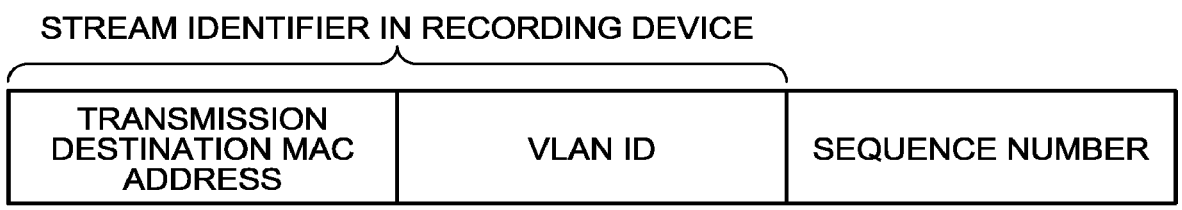
FIG. 16 is a view illustrating an example of a frame identifier when a frame is recorded in the recording device.
Figure 17:
FIG. 17 is a view illustrating an example of the frame identifier when a frame is not stored in the recording device.

The frame identifier can be determined as illustrated in FIGS. 16 and 17, for example. FIG. 16 is a view illustrating an example of the frame identifier when a received frame or a replicated frame of the received frame is recorded in the recording device 200. In this case, the frame identifier includes a stream identifier and a sequence number in the recording device 200. The stream identifier in the recording device 200 includes a transmission destination MAC address and a VLAN ID when received by the transfer unit 210 of the recording device 200.

FIG. 17 is a view illustrating an example of the frame identifier when the received frame or the replicated frame of the received frame is not recorded in the recording device 200. In this case, the frame identifier includes a stream identifier and a sequence number in the control device 100. The stream identifier in the control device 100 includes a transmission destination MAC address when received by the transfer unit 110 of the control device 100 instructing recording and the smallest VLAN ID among streams in which the frame is replicated. Incidentally, it is unnecessary to use the smallest VLAN ID, and it is sufficient to specify one VLAN ID among the VLAN IDs to be duplicated. For example, a predetermined VLAN ID among the plurality of VLAN IDs or the largest VLAN ID may be used.

Returning to the description of FIG. 15, the number of data sets indicates the number of subsequent data sets. The number of data sets in this case is one. The stream identifier included in the data set stores the stream identifier in the control device 100. The presence or absence of frame accompanying information indicates whether there is subsequent frame accompanying information. When there is no frame accompanying information, frame accompanying information such as a reception time of the frame, presence or absence of an FCS error, and a reception port number is not stored. The presence or absence of frame information indicates presence or absence of subsequent frame information. The presence or absence of frame accompanying information and the presence or absence of frame information are used in the case of recording only the frame information and the case of recording only the frame accompanying information.

Figure 18:
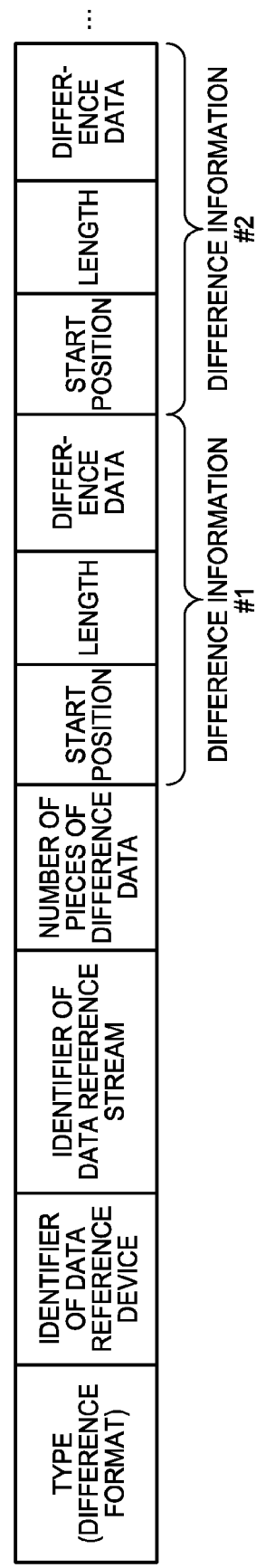
FIG. 18 is a view illustrating an example of a format of frame information.

FIGS. 18 and 19 are views illustrating an example of a format of frame information. There are two types of frame information. One is a difference format (FIG. 18), and the other is a whole recording format (FIG. 19). As illustrated in FIGS. 18 and 19, a head of frame information indicates a type of frame information. The type stores a value indicating whether it is the difference format or the whole recording format.

The difference format has a function of transferring only a difference from reference data. It is possible to reduce the amount of transmission data by using the frame information of the difference format. The difference format frame information includes an identifier of a reference device used to refer data as a basis, an identifier of a stream subjected to data reference, the number of pieces of difference data, and difference data corresponding to the number of pieces of difference data.

The reference device may be either the recording device 200 or the control device 100. For example, when there is an FCS error in a frame that has been already recorded in the recording device 200 and recording of a frame having no FCS error has been instructed, it is desirable to record a difference from the frame having no FCS error as will be described later. In this case, the control device 100 that has received the frame having no FCS error is used as the reference device. If there is no FCS error in the frame that has been already recorded in the recording device 200, the recording device 200 is used as the reference device.

As described above, a MAC address or the like can be used as the identifier of the device. A combination of a MAC address and a VLAN ID can be used as the stream identifier. It is possible to store a plurality of pieces of consecutive difference information in the difference format. The number of pieces to be stored is set to the number of pieces of difference data.

The difference information includes a start position, a length, and difference data. The start position indicates a position of a head of a portion with different data with reference to a head of a frame to be referred to. In the difference data, data from the start position to a position indicated by the "length" is stored. The start position and the length are handled in units of octets, for example. Only data of a portion having a difference from the frame recorded in the reference device is recorded in the difference information, and the same data is not recorded.

On the other hand, the whole recording format includes a length and frame entire data. A length of a frame is set to the length. Data constituting the frame is stored in the frame entire data.

Figure 20:
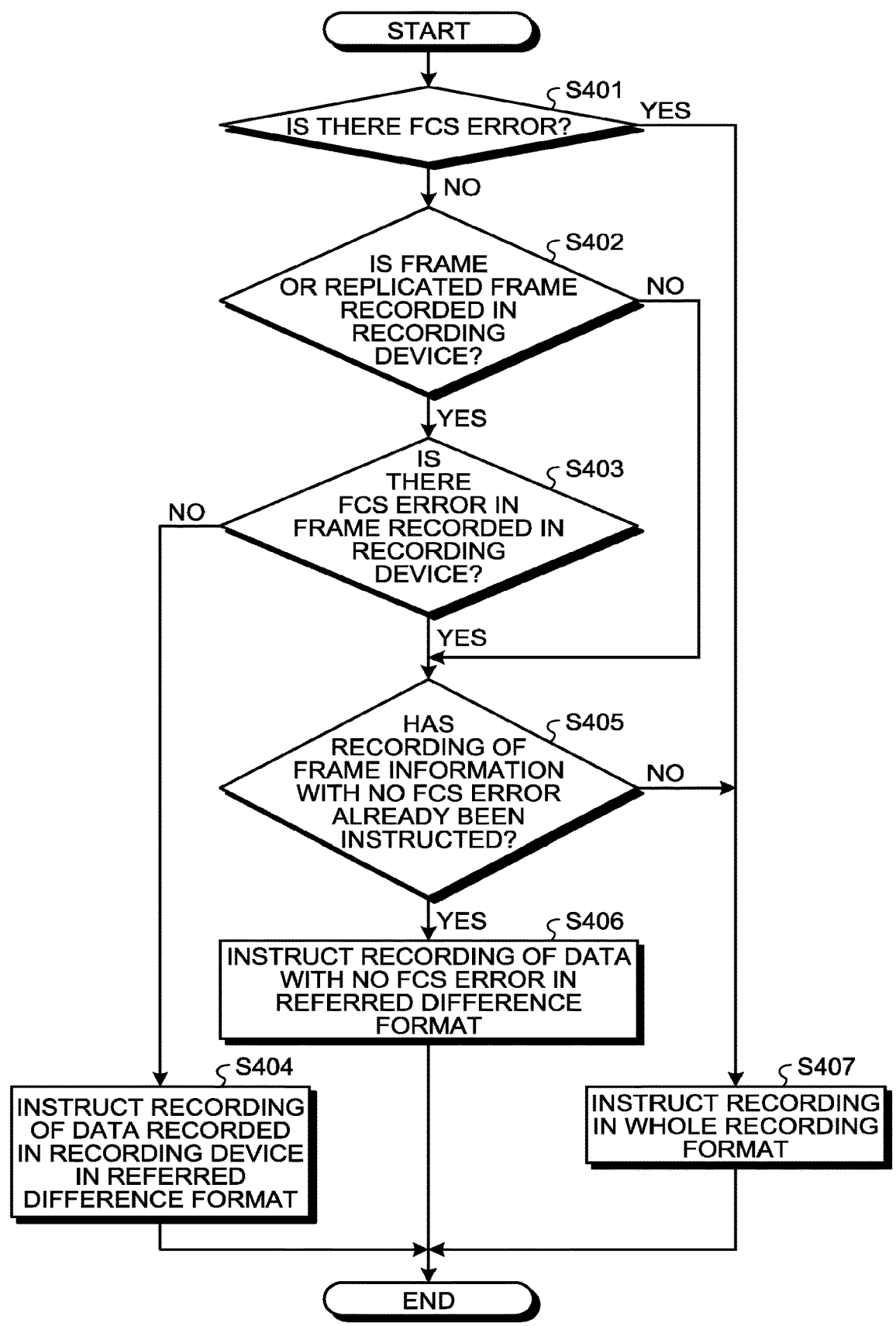
FIG. 20 is a flowchart of a selection process.

As described above, the two formats of frame information can be used in the present embodiment. FIG. 20 is a flowchart illustrating an example of a selection process to select one of the two formats. The selection process is executed to select any format to be used for recording in the case of instructing recording of frame information, for example, in Steps S114 and S117 in FIG. 11.

The recording management unit 195 first refers to the frame temporary storage 196 and confirms whether there is an FCS error in a frame for which frame information is to be transmitted (Step S401). If there is the FCS error (Step S401: Yes), the recording management unit 195 instructs the frame recording instruction unit 197 to perform recording in the whole recording format (Step S407). On the other hand, when there is no FCS error (Step S401: No), the recording management unit 195 refers to the frame temporary storage 196 and investigates whether the frame or the replicated frame thereof is recorded in the recording device 200 (Step S402).

When the frame is recorded in the recording device 200 (Step S402: Yes), the recording management unit 195 further confirms whether there is an FCS error in the frame recorded in the recording device 200 (Step S403). When there is no FCS error (Step S403), the recording management unit 195 instructs recording in the difference format referring to the frame recorded in the recording device 200 (Step S404).

When the frame is not recorded in the recording device 200 (Step S402: No) and there is the FCS error in the frame recorded in the recording device 200 (Step S403: Yes), the recording management unit 195 confirms whether the recording of the frame information having no FCS error has been instructed in the past (Step S405). This may be performed by referring to the fields of "Recording in Recording Device", "FCS Error", and "Frame Information Recording Instruction" illustrated in FIG. 14. When the recording has been instructed in the past (Step S405: Yes), the recording management unit 195 instructs the recording in the difference format referring to the frame of the recorded stream (Step S406). When the recording has not been instructed in the past (Step S405: No), the recording management unit 195 instructs the recording in the whole recording format (Step S407).

Figure 21:
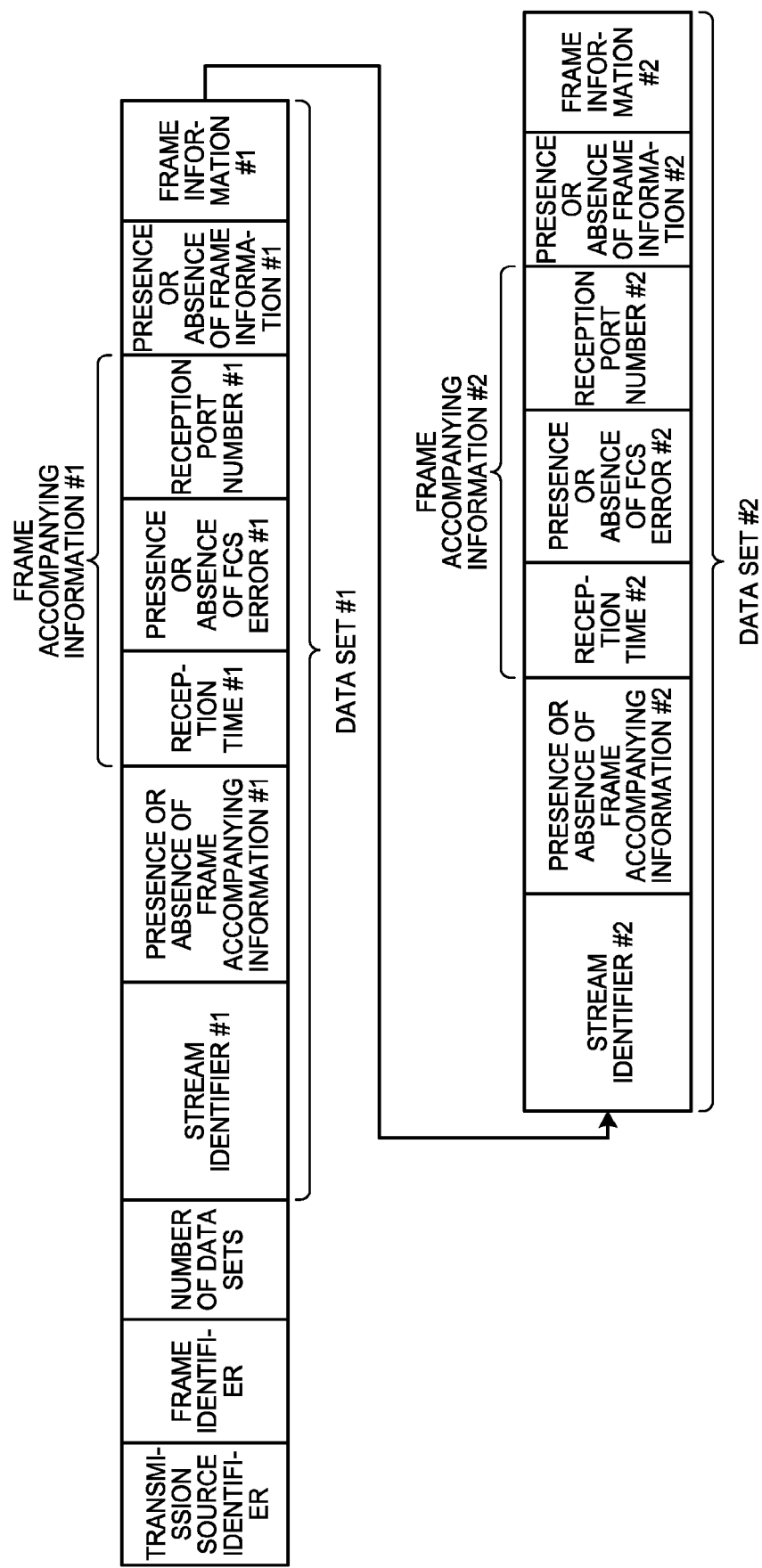
FIG. 21 is a view illustrating an example of a command when a frame is replicated.

FIG. 21 is a view illustrating an example of a command when a frame is replicated. As illustrated in FIG. 21, there is a case where a plurality of data sets are stored in the command when the frame is replicated and transmitted.

Figure 22:
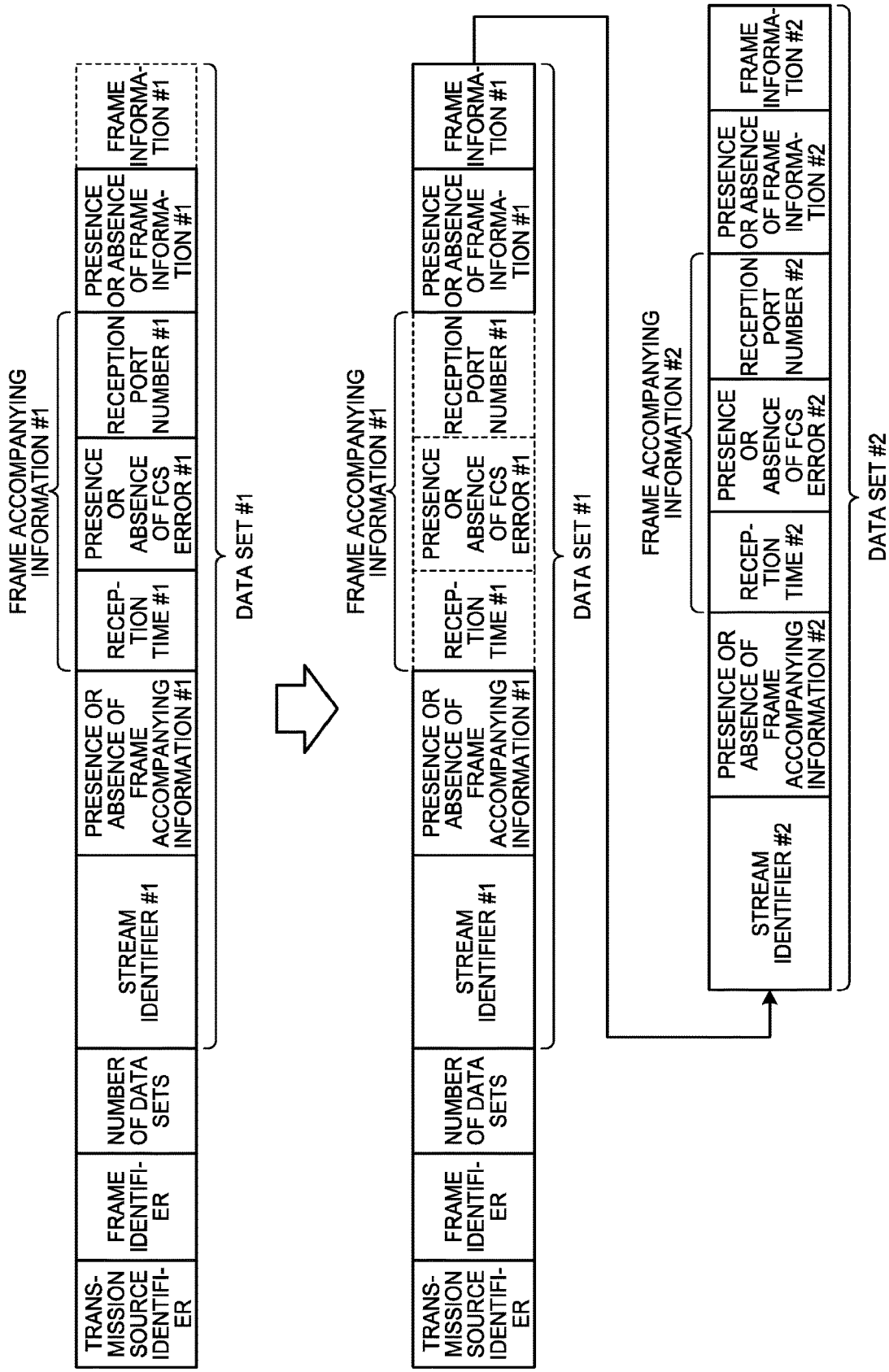
FIG. 22 is a view illustrating an example of a command.
Figure 23:
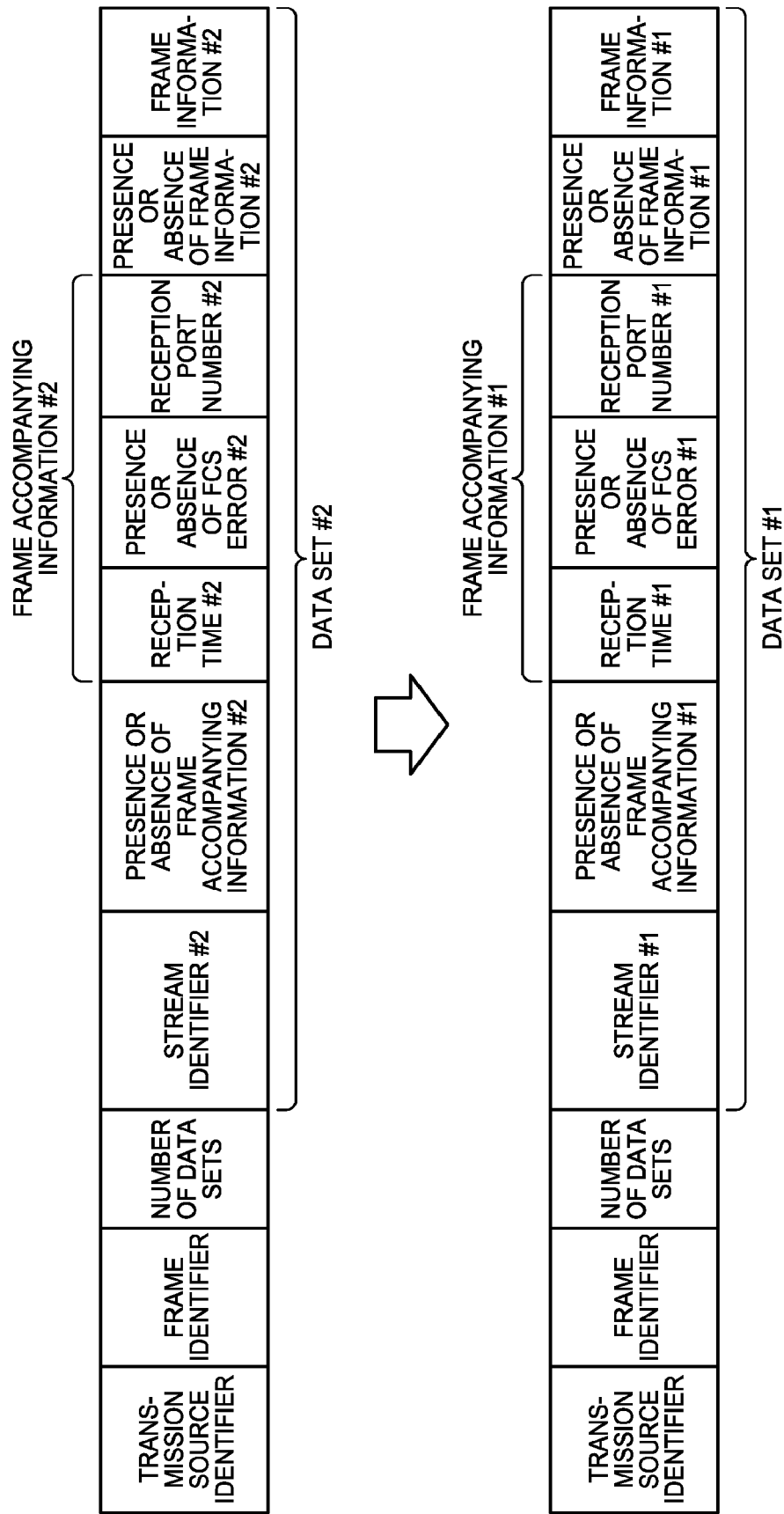
FIG. 23 is a view illustrating an example of a command.

Next, an example of a command difference caused by a difference in frame reception timing will be described with reference to FIGS. 22 and 23. FIG. 22 is a view illustrating an example of a command when a replicated frame that is not recorded in the recording device 200 has been received before receiving a frame recorded in the recording device 200. FIG. 23 is a view illustrating an example of the command when the replicated frame that is not recorded in the recording device 200 has been received after receiving the frame recorded in the recording device 200.

The upper part of FIG. 22 is an example of the command instructing recording of the frame when the replicated frame that is not recorded in the recording device 200 has been received. In this case, the frame that has been already recorded in the recording device 200 is not stored in the frame temporary storage 196, and thus, the frame information is not recorded, and the command to record only the frame accompanying information is issued (Step S116 in FIG. 11). Incidentally, the broken-line part indicates that corresponding data is not to be transmitted.

The lower part of FIG. 22 is an example of the command to instruct recording of the frame when the frame recorded in the recording device 200 has been received thereafter. In the case of the network configuration in which the frame is replicated in two streams as illustrated in FIG. 6, all the frames have been received, and thus, the recording of the frame information of the received frame is instructed (Step S114 in FIG. 11). As illustrated in FIG. 22, the recording of frame accompanying information has already been instructed for a data set #1, and thus, "Absent" may be set to the presence or absence of frame accompanying information, and the recording of frame accompanying information may be omitted. In addition, the recording of frame information of the data set #1 has not been instructed, the recording is instructed together with a data set #2 at this timing.

The upper part of FIG. 23 is an example of the command to instruct recording of the frame when the frame that is recorded in the recording device 200 has been previously received. In this case, the command to record the frame information and the frame accompanying information of the frame already recorded in the recording device 200 is issued (Step S117 in FIG. 11).

The lower part of FIG. 23 is an example of the command to instruct recording of the frame when the replicated frame not recorded in the recording device 200 has been received thereafter. Since all the frames have been received, the recording of frame information and frame accompanying information of the frame is instructed (Step S114 in FIG. 11). In this case, since both the frame information and the frame accompanying information of the data set #2 have already been recorded, the recording of the frame information and the frame accompanying information of the data set #1 is instructed.

Figure 24:
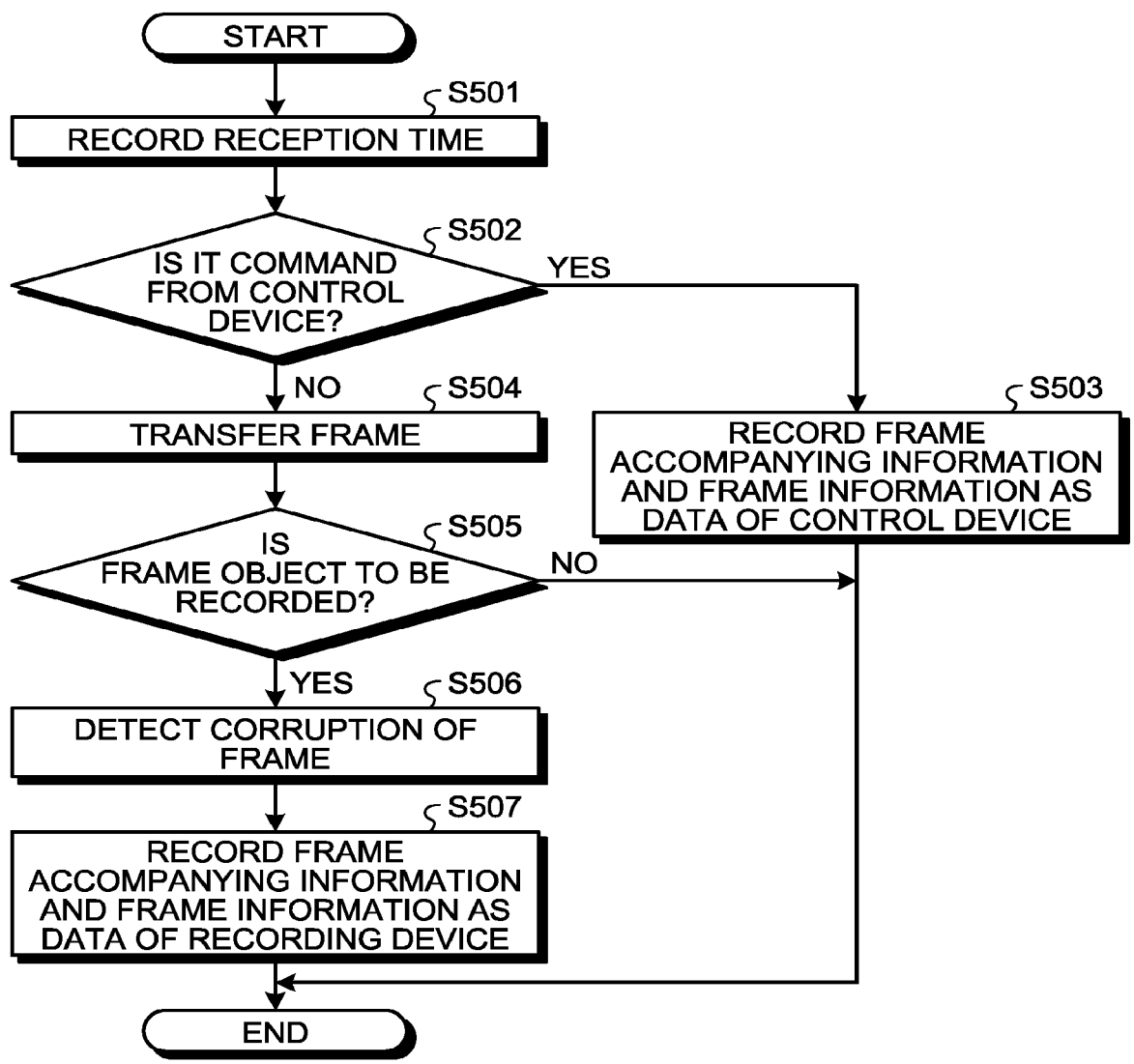
FIG. 24 is a flowchart of a recording process executed by the recording device.

Next, a recording process executed by the recording device 200 will be described with reference to FIG. 24. FIG. 24 is a flowchart illustrating an example of the recording process executed by the recording device 200.

When receiving a frame, the communication unit (the communication unit 214 or the communication unit 215) of the recording device 200 records information (a port number or the like) indicating any communication unit from which the frame has been received similarly to the control device 100 and a time stamp indicating time at which the frame has been received, for example, in the storage 201 (Step S501).

Next, the transfer unit 210 determines whether the received frame is a command addressed to the own device that has been transmitted from the control device 100 (Step S502). When it is the command addressed to the own device (Step S502: Yes), the acceptance unit 230 records frame accompanying information and frame information included in the command in the storage 201 as data of the control device 100 (Step S503).

When it is not the command addressed to the own device (Step S502: No), the transfer unit 210 transfers the frame to another device which is a destination (Step S504). Meanwhile, the object determination unit 290 determines whether the received frame before being subjected to the removal process is an object to be recorded (Step S505).

For example, the object determination unit 290 executes the recording determination process illustrated in FIG. 12. In this manner, the object determination unit 191 of the control device 100 and the object determination unit 290 of the recording device 200 may execute the same recording determination process. A different recording determination process may be executed between the object determination unit 191 and the object determination unit 290 by executing some of FIG. 12.

When the received frame is not the object to be recorded (Step S505: No), the recording device 200 ends the process. When the received frame is the object to be recorded (Step S505: Yes), the corruption detection unit 202 detects whether the frame is corrupted by checking an FCS error similarly to the control device 100 (Step S506). If an error occurs as a result of the FCS check, the corruption detection unit 202 records that the FCS error has occurred in the frame. In addition, the corruption detection unit 202 records the received frame as data of the recording device 200 in the storage 201 (Step S507).

FIG. 25 is a view illustrating a configuration example of data stored in the storage 201 of the recording device 200. Each data is managed by a frame identifier. Data is recorded for each frame identifier to be divided into data of the recording device 200, data 1 of the control device, data 2 of the control device, and so on. A reception time in the recording device 200, data constituting the entire frame received by the recording device 200 and a length thereof, presence or absence of an FCS error when received by the recording device 200, and a reception port number received by the recording device 200 are recorded in data fields of the recording device 200. These fields are recorded when being set as an object to be recorded by the recording device 200.

On the other hand, an identifier of the control device 100, a stream identifier, a reception time in the control device 100, frame data, presence or absence of an FCS error in the control device 100, and a reception port number in the control device 100 are recorded, respectively, in data fields of the control device 100.

Incidentally, a processing timing of the command is not limited to the above description, and a command may be written from the control device 100 to the storage 201 of the recording device 200 once by, for example, nonvolatile memory (NVM) express over fabrics or the like, and then, stored in the storage 201 after being read and processed by the recording device 200.

Modification 1

In the above embodiment, a method of using the redundancy tag defined in IEEE 802.1CB has been illustrated as a format of a frame for replication and removal Instead, a high-availability seamless redundancy (HSR) and a parallel redundancy protocol (PRP) stipulated in IEC 62439-3: 2006 may be applied. Instead of the redundancy tag, an HSR sequence tag is used in the case of the HSR, and a PRP sequence trailer is used in the case of the PRP.

Modification 2

The example in which the transmission stream management units and the reception stream management units of the respective devices (the control device 100 and the recording device 200) hold the information (the replication transmission table, the removal table, and the like) on the replication and removal processes for each device has been described in the above embodiment. These pieces of information may be shared by the respective devices.

Modification 3

Figure 26:
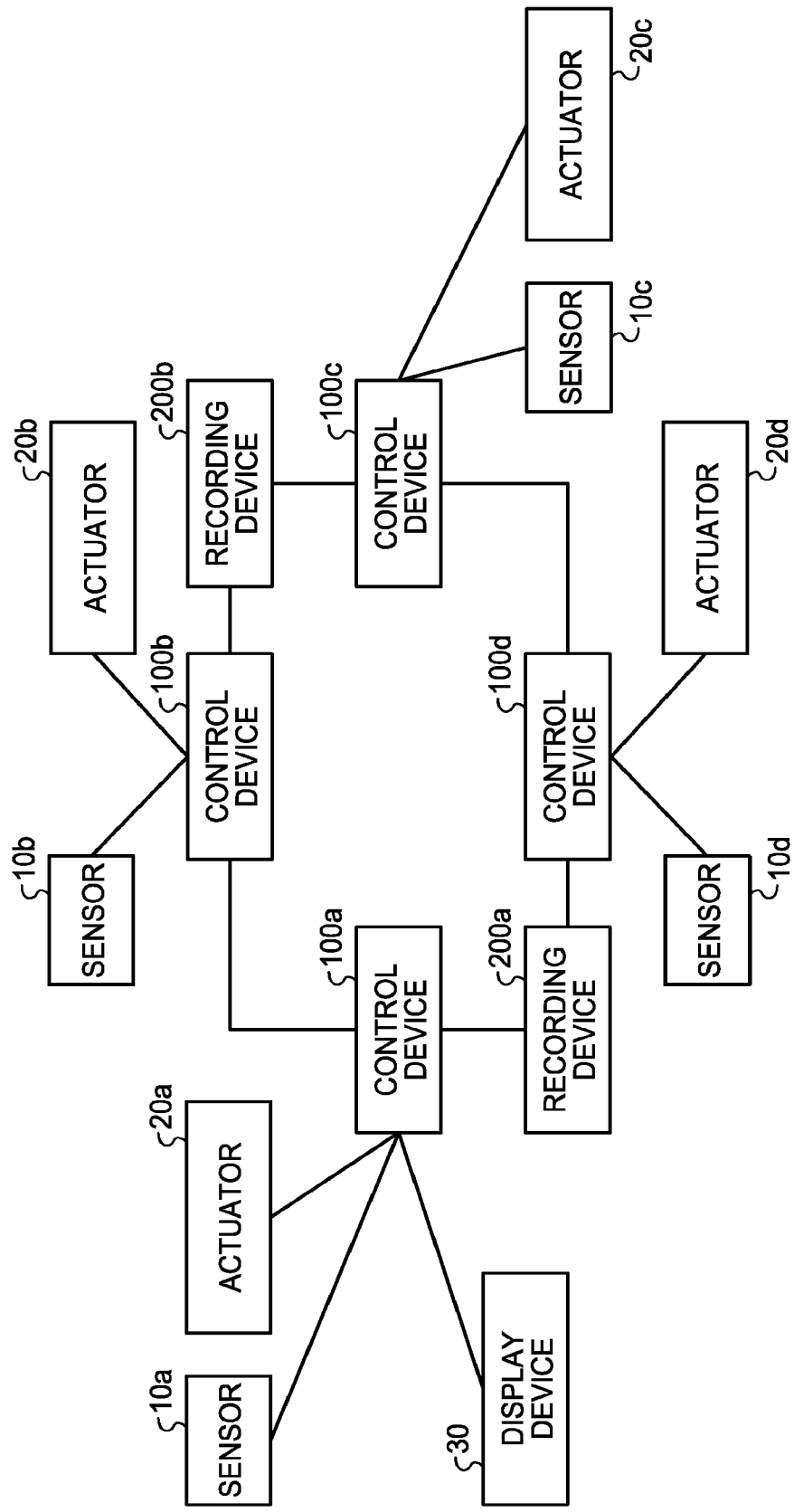
FIG. 26 is a block diagram of a communication system according to Modification 3.

The single recording device is provided in the above embodiment. As illustrated in FIG. 26, the communication system may include a plurality of recording devices. Incidentally, FIG. 26 illustrates an example in which two recording devices (recording devices 200a and 200b) are provided, but three or more recording devices may be provided.

Even when the plurality of recording devices 200 are provided, the recording determination unit 193 performs recording determination using each of the recording devices 200 as an object and outputs frame information in accordance with a result of the determination, thereby can reducing the consumption of bandwidths. When considering an accident or the like, it is preferable to arrange the plurality of recording devices 200 at remote places.

Figure 27:
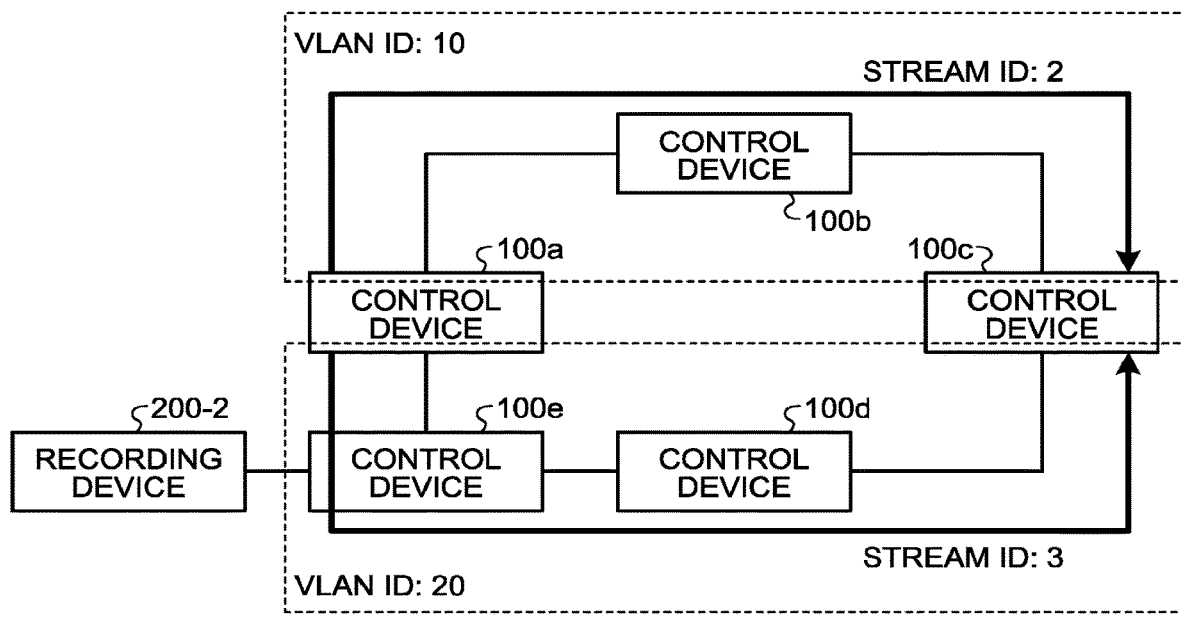
FIG. 27 is a block diagram of a communication system according to Modification 4.

Modification 4 In the above embodiment, the connection mode in which at least one of redundantly transmitted frames passes through the recording device 200 is used, and a load on the network bandwidth is reduced by recording the difference from the frame recorded in the recording device 200. It is possible to reduce the load on the network bandwidth even when redundantly transmitted frames do not pass through the recording device 200-2, which is connected to the control device 100e, as illustrated in FIG. 27.

Figure 28:
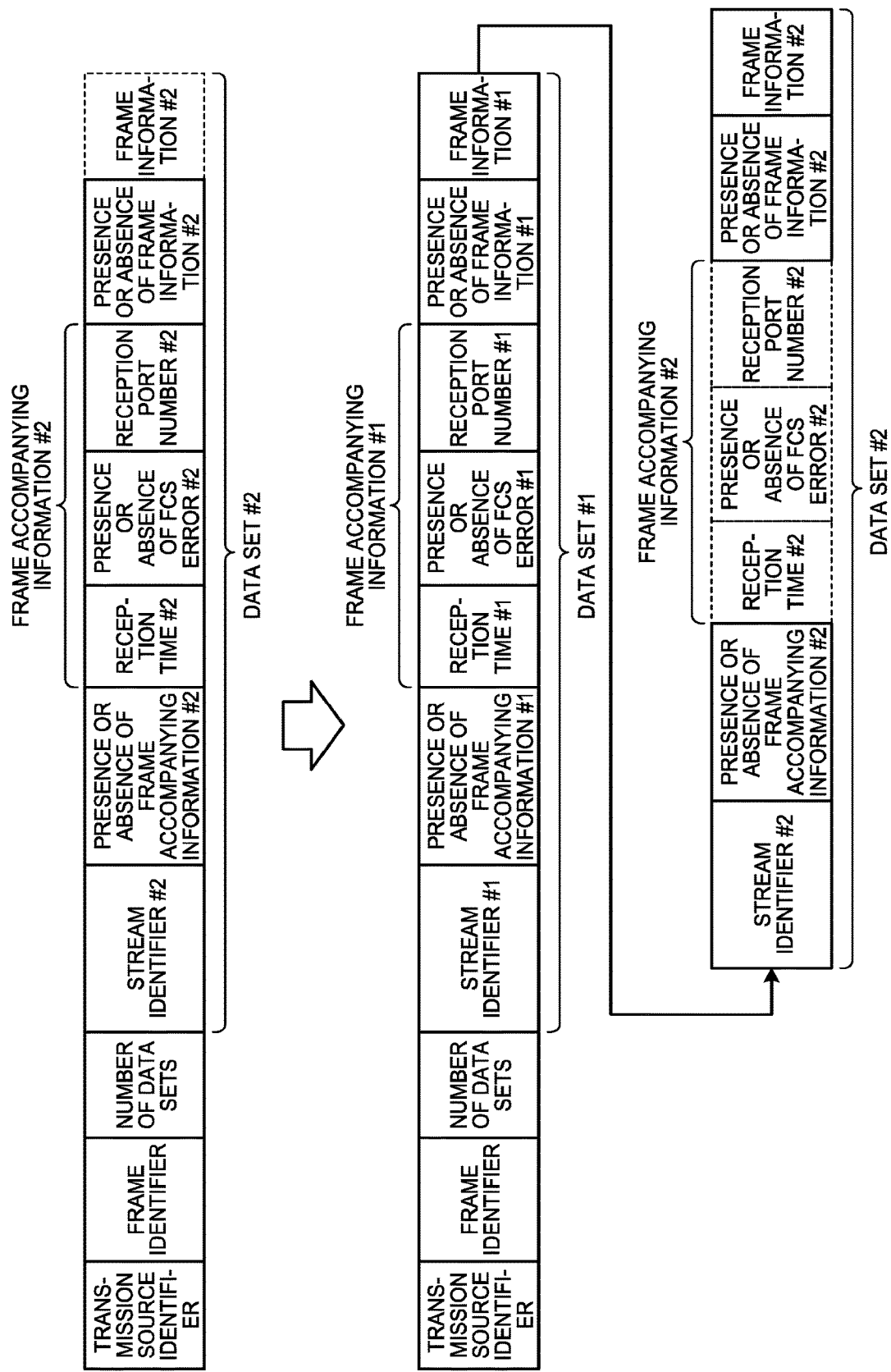
FIG. 28 is a view illustrating an example of a command of Modification 4.

For example, as illustrated in FIG. 28, the control device 100 instructs recording of only frame accompanying information for a frame that has been previously received. When receiving a replicated frame, the control device 100 transmits frame information (whole recording format) of the previously-received frame, frame accompanying information, and frame information (difference format) of a frame received thereafter. As a result, it is unnecessary to redundantly transmit data of two replicated frames, and it is possible to reduce the load on the network bandwidth.

In this manner, the difference of the frame data is transmitted in the control device according to the present embodiment so that it is possible to record log data indicating presence or absence of an abnormality in a communication path in the recording device 200 while reducing the network bandwidths. The recorded information can be used for analysis of a cause of an accident, for example, when the accident occurs.

Figure 29:
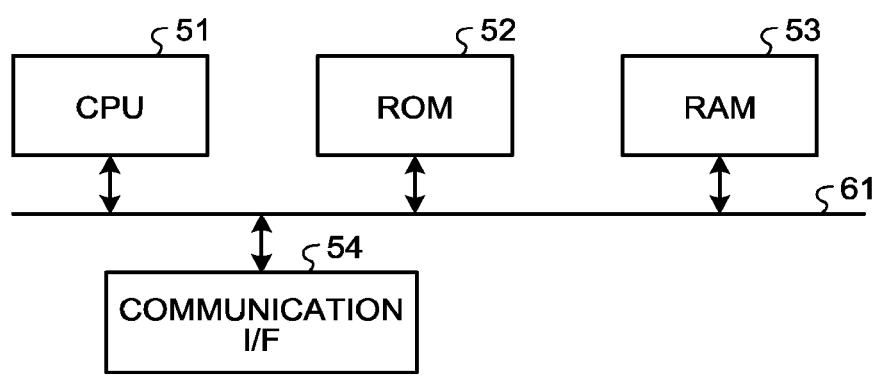
FIG. 29 is a hardware configuration diagram of a device according to the present embodiment.

Next, a hardware configuration of a device (a control device or a recording device) according to the present embodiment will be described with reference to FIG. 29. FIG. 29 is an explanatory diagram illustrating the hardware configuration example of the device according to the present embodiment.

The device according to the present embodiment includes a device such as a central processing unit (CPU) 51, a storage device such as read only memory (ROM) 52 and random access memory (RAM) 53, a communication I/F 54 connected to a network to perform communication, and a bus 61 that connects the respective units.

A program to be executed by the device according to the present embodiment is provided by being incorporated in advance in the ROM 52 or the like.

The program to be executed by the device according to the present embodiment may be configured to be recorded in a file in an installable format or an executable format in a computer-readable recording medium such as a compact disk read only memory (CD-ROM), a flexible disk (FD), compact disk recordable (CD-R), and a digital versatile disk (DVD), provided as a computer program product and provided as a computer program product.

In addition, it may be configured such that the program executed by the device according to the present embodiment is stored in a computer connected to the network such as the Internet and is provided through download via the network. In addition, it may be configured such that the program executed by the device according to the present embodiment is provided or distributed via the network such as the Internet.

The program executed by the device according to the present embodiment allows a computer to function as the respective units of the device described above. This computer can read and execute the program from the computer-readable storage medium on the main storage device by the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device, comprising:
one or more processors configured to
receive a message;
determine whether the received message is one of messages that are replicated by another control device, each of the messages being transmitted by the another control device to the control device via a different corresponding route; and
instruct recording of a difference between a particular recorded message of the messages and the received message that is determined to be one of the messages,
wherein the one or more processors do not record the received message that is determined to be the one of the messages,
wherein the one or more processors are further configured to
determine whether the received message is an object to be recorded, and
determine whether a message determined as an object to be recorded is the one of the messages.

2. The control device according to claim 1, wherein the one or more processors are further configured to
determine whether the received message is an object to be recorded in a recording device connected via a network, and
instruct recording of the difference between the particular recorded message and the received message that is the object to be recorded in the recording device and is the one of the messages.

3. The control device according to claim 2, wherein
the one or more processors are further configured to determine whether the received message has been transmitted via the recording device based on a connection relationship with the recording device to determine whether the received message is the object to be recorded in the recording device.

4. The control device according to claim 1, wherein the one or more processors are further configured to instruct recording of accompanying information of the received message.

5. The control device according to claim 4, wherein the one or more processors are configured to instruct the recording of the accompanying information, which includes at least one of a reception time of a message and information to detect an error of the message.

6. The control device according to claim 4, wherein the one or more processors are further configured to
determine whether the received message is an object to be recorded in a recording device connected via a network, and
instruct recording of the accompanying information of the received message that is not the object to be recorded in the recording device and is the one of the messages.

7. The control device according to claim 6, wherein
the one or more processors are configured to instruct recording of the accompanying information of the received message that is the object to be recorded in the recording device and is one of the messages, after recording of the accompanying information has been instructed.

8. The control device according to claim 1, wherein the recorded message of the messages is a message recorded in a recording device connected via a network.

9. The control device according to claim 1, wherein the one or more processors are configured to instruct recording of the received message that is determined not to be the one of the messages.

10. A control device, comprising:
one or more processors configured to
receive a message;
determine whether the received message is one of messages that are replicated by another control device, each of the messages being transmitted by the another control device to the control device via a different corresponding route; and
instruct recording of difference information indicative of a difference between a particular recorded message of the messages and the received message that is determined to be one of the messages, and instruct recording of the received message that is determined not to be the one of the messages, wherein
the one or more processors are further configured to
determine whether the received message is an object to be recorded in a recording device connected via a network,
instruct recording of the difference information corresponding to the received message that is determined to be the object to be recorded in the recording device and is the one of the messages,
determine whether the received message has been transmitted via the recording device based on a connection relationship with the recording device to determine whether the received message is the object to be recorded in the recording device,
determine whether the received message is an object to be recorded, and
determine whether a message determined as an object to be recorded is the one of the messages.

11. The control device according to claim 10, wherein the one or more processors are further configured to instruct recording of accompanying information of the received message.

12. The control device according to claim 10, wherein the recorded message of the messages is a message recorded in a recording device connected via a network.

13. A control device, comprising:
one or more processors configured to
receive a message;
determine whether the received message is one of messages that are replicated by another control device, each of the messages being transmitted by the another control device to the control device via a different corresponding route; and
instruct recording of difference information indicative of a difference between a particular recorded message of the messages and the received message that is determined to be one of the messages, and instruct recording of the received message that is determined not to be the one of the messages, wherein
the one or more processors are further configured to instruct recording of accompanying information of the received message, and
the one or more processors are configured to instruct the recording of the accompanying information, which includes at least one of a reception time of a message and information to detect an error of the message, wherein the one or more processors are further configured to
- determine whether the received message is an object to be recorded in a recording device connected via a network, and
- instruct recording of the accompanying information corresponding to the received message that is determined to be the object to be recorded in the recording device and that is determined to be the one of the messages.

14. The control device according to claim 13, wherein the one or more processors are further configured to instruct recording of the accompanying information of the received message that is the object to be recorded in the recording device and is the one of the messages, after recording of the accompanying information has been instructed.

* * * * *